United States Patent
Yonetani

(10) Patent No.: US 9,511,675 B2
(45) Date of Patent: Dec. 6, 2016

(54) METHODS OF DECREASING PEAK ENERGY CONSUMPTION

(71) Applicant: Nissan North America, Inc., Franklin, TN (US)

(72) Inventor: Shinsuke Yonetani, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 650 days.

(21) Appl. No.: 14/025,872

(22) Filed: Sep. 13, 2013

(65) Prior Publication Data

US 2015/0081122 A1 Mar. 19, 2015

(51) Int. Cl.
*G06Q 50/06* (2012.01)
*B60L 11/18* (2006.01)
*H02J 7/16* (2006.01)

(52) U.S. Cl.
CPC .......... *B60L 11/1838* (2013.01); *G06Q 50/06* (2013.01); *H02J 7/16* (2013.01)

(58) Field of Classification Search
CPC ........ G06Q 50/06; H02J 7/00; H02J 7/0027; H02J 7/04; H02J 7/042; H02J 7/14; H02J 7/16; H02J 7/1415; B60L 11/1809; B60L 11/1812; B60L 11/1824; B60L 11/1838; B60L 11/1844
See application file for complete search history.

(56) References Cited

U.S. PATENT DOCUMENTS

| | | | |
|---|---|---|---|
| 5,995,022 A * | 11/1999 | Plis | G01R 21/1333 340/870.02 |
| 7,684,942 B2 | 3/2010 | Yun et al. | |
| 7,747,739 B2 * | 6/2010 | Bridges | B60L 3/12 307/80 |
| 7,783,390 B2 | 8/2010 | Miller | |
| 7,844,370 B2 * | 11/2010 | Pollack | B60L 11/1824 315/80 |
| 7,949,435 B2 * | 5/2011 | Pollack | B60L 11/1811 315/80 |
| 8,103,386 B2 | 1/2012 | Ichikawa et al. | |
| 8,471,406 B2 * | 6/2013 | Patel | H02J 3/28 307/66 |
| 8,694,176 B2 * | 4/2014 | Yamamoto | G06F 1/263 700/286 |
| 8,849,687 B2 * | 9/2014 | Hakim | B60L 11/1824 705/7.13 |
| 9,071,068 B2 * | 6/2015 | Nishikawa | H01M 10/44 |
| 9,222,984 B2 * | 12/2015 | Iwasaki | H02J 3/32 |

(Continued)

FOREIGN PATENT DOCUMENTS

WO 2013041656 A2 9/2012

*Primary Examiner* — Charles Kasenge
(74) *Attorney, Agent, or Firm* — Young Basile Hanlon & MacFarlane, P.C.

(57) ABSTRACT

Methods of reducing peak energy consumption of a power consumer are provided. One such method comprises pre-programming an actual consumption line based on actual power usage, the actual consumption line having peak start time, a peak end time and a peak consumption time; determining a connection period of a battery of a vehicle to a charging station of the power consumer; determining an available energy between the required departure energy of the battery and the connection energy; determining an average expected consumption line that averages the actual power usage over the connection period; and determining a charge/discharge line by adjusting the average expected consumption line based on the available energy and the connection period.

18 Claims, 19 Drawing Sheets

(56) References Cited

U.S. PATENT DOCUMENTS

| | | |
|---|---|---|
| 2008/0167756 A1 | 7/2008 | Golden et al. |
| 2010/0019729 A1* | 1/2010 | Kaita ............... B60L 11/123 320/134 |
| 2010/0082277 A1* | 4/2010 | Ballard ............. B60L 11/1809 702/63 |
| 2010/0211233 A1 | 8/2010 | Roscoe et al. |
| 2010/0293045 A1 | 11/2010 | Burns et al. |
| 2011/0074350 A1* | 3/2011 | Kocher ............. B60L 11/1816 320/109 |
| 2011/0101779 A1* | 5/2011 | Patel ................... H02J 3/28 307/64 |
| 2011/0106336 A1 | 5/2011 | Eikeland et al. |
| 2011/0125337 A1 | 5/2011 | Zavadsky et al. |
| 2011/0178959 A1* | 7/2011 | Nakajima ......... B60L 11/1824 705/412 |
| 2011/0204720 A1 | 8/2011 | Ruiz et al. |
| 2011/0257803 A1* | 10/2011 | Yamamoto ............ G06F 1/263 700/291 |
| 2011/0270476 A1* | 11/2011 | Doppler ............ B60L 11/1816 701/22 |
| 2012/0029711 A1 | 2/2012 | Besore et al. |
| 2012/0323386 A1* | 12/2012 | Ito ......................... H02J 3/32 700/291 |
| 2013/0069659 A1* | 3/2013 | Iwasaki .................. H02J 3/32 324/426 |
| 2013/0099751 A1* | 4/2013 | Nishikawa ........... H01M 10/44 320/128 |
| 2013/0179061 A1 | 7/2013 | Gadh et al. |
| 2013/0335032 A1* | 12/2013 | Kuribayashi ....... B60L 11/1844 320/137 |
| 2014/0009117 A1* | 1/2014 | Ishii ........................ H02J 7/34 320/126 |

* cited by examiner

METHODS OF DECREASING PEAK ENERGY CONSUMPTION

TECHNICAL FIELD

This disclosure relates in general to methods of decreasing peak energy consumption of a power consumer, and in particular, relate to methods of peak shaving using a selectively connectable battery, such as a battery of an electric or hybrid vehicle.

BACKGROUND

For industrial and commercial power consumers, generally electricity prices are based on two elements: actual usage and a penalty based on the highest point of demand (or peak) within a billing period (weekly, monthly or annually). Demand is calculated using demand intervals, a short timeframe (often 15 minutes) during which overall usage is aggregated and tracked as a total. The average calculated is the kW demand for this period. Peak shaving is the ability to control the usage of power from a power supplier during intervals of high demand, in order to limit or reduce demand penalties for the billing period.

There are two possible approaches to peak shaving: reducing usage through load shedding and adding capacity with on-site generation. One example of adding capacity with on-site generation is through the use of a stationary battery that is charged during periods of low energy demand and discharged to the power consumer during periods of peak demand. Using a stationary battery in this way does not change a power consumer's actual usage but does decrease the highest point of demand and therefore the penalty owed by the power consumer.

SUMMARY

Disclosed herein are methods of decreasing peak energy consumption of a power consumer. One method disclosed herein for decreasing peak energy consumption of a power consumer comprises preprogramming an actual consumption line based on actual power usage; determining a connection period of a battery to a charging station of the power consumer; determining an available energy based on the required departure energy of and the connection energy of the battery; determining an average expected consumption line that averages the actual power usage over the connection period; and determining charging periods and discharging periods based on a charge line, a discharge line, and the average expected consumption line; determining a predicted battery capacity across the connection period; determining an energy transfer deficiency; and adjusting the discharge line based on the energy transfer deficiency.

A further method disclosed herein for decreasing peak energy consumption of a power consumer comprises preprogramming an actual consumption line based on expected power usage; determining a connection period of a selectively connectable battery to a charging station of the power consumer between a connection time and a departure time; determining an available energy based on a difference between a connection energy and a required departure energy; determining an average expected consumption line over the connection period based on the actual consumption line and the available energy; setting a charge line and a discharge line equal to the average expected consumption line; determining charging periods and discharging periods based on the charge line and discharge line crossing the actual consumption line; determining a predicted battery capacity across the connection period based on charging the battery during the charging periods and discharging the battery during the discharging periods; determining whether there is an energy transfer deficiency; and adjusting the discharge line based on the energy transfer deficiency.

These and other aspects of the present disclosure are disclosed in the following detailed description of the embodiments, the appended claims and the accompanying figures.

BRIEF DESCRIPTION OF THE DRAWINGS

The various features, advantages and other uses of the present apparatus will become more apparent by referring to the following detailed description and drawing in which.

DETAILED DESCRIPTION

As electric vehicles increase in number, the need for charging stations to charge the electric vehicles also increases. As used herein, the terms "EV" and "electric vehicle" include hybrid vehicles that use a charging station. An owner of an electric vehicle will typically have an electric vehicle (EV) charger at his or her residence. However, EV chargers are also needed at an owner's place of employment and other destinations to which an owner drives his or her EV so that the EV has sufficient power to return to the residence.

Figure 1:
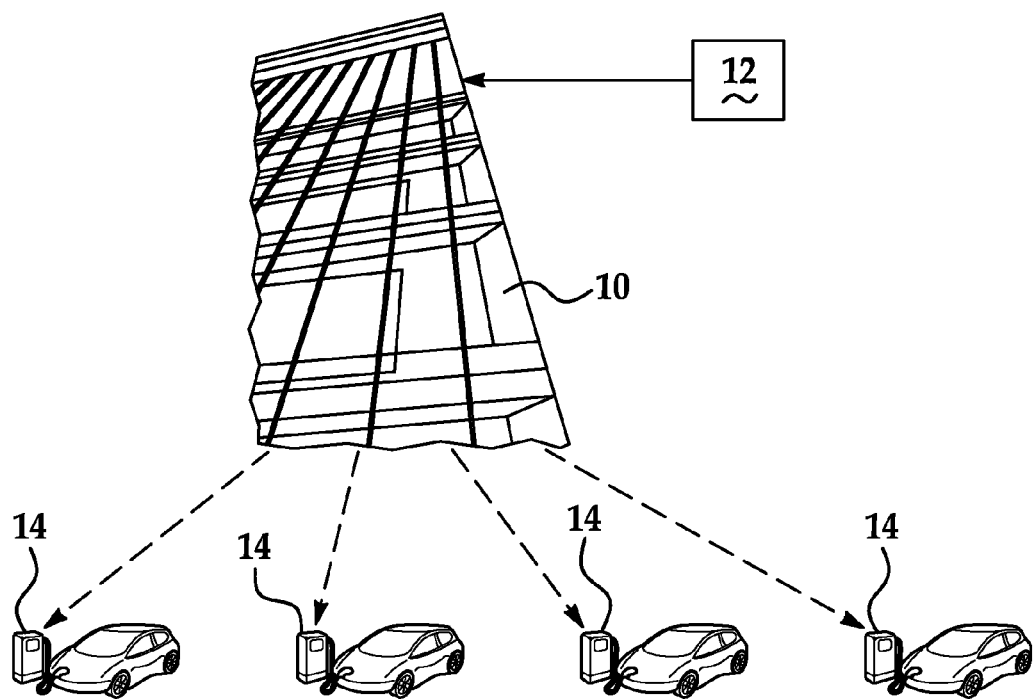
FIG. 1 is a schematic of a power consumer providing power from a power grid to EV charging stations.

To accommodate the EV owners, whether the owner is an employee or customer, commercial businesses will increasingly offer EV charging stations for use while the owner is on site at the commercial business. Often times, these commercial businesses are large power consumers. As used herein, a "power consumer" is a residential, commercial, or industrial user of power from the power grid. Examples include but are not limited to office buildings, manufacturing facilities, large retail facilities, amusement parks, museums and other tourist facilities, and the like. As a large user of power, the power consumer is likely to experience periods of peak demand that increase the price it pays for power. FIG. 1 is a schematic of a power consumer 10 pulling power from the power grid 12. The power consumer 10 provides power to EV charging stations 14 utilized by employees of, customers of, or visitors to the power consumer 10, for example.

Figure 2:
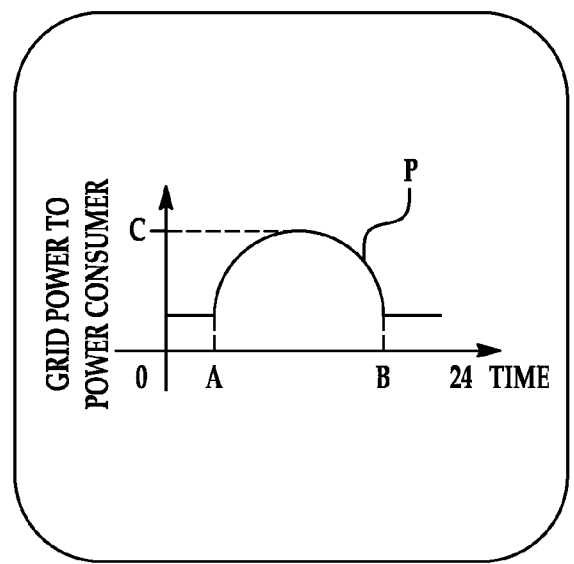
FIG. 2 is a graph illustrating power pulled from the power grid by a power consumer over a twenty-four hour period.

Offering EV charging stations will increase a power consumer's actual usage and likely increase the power consumer's peak consumption. The peak consumption period for power consumers typically occurs during the day, such as between the hours of about 8 am and 6 pm, as these hours are typically when the most employees or customers are on-site, requiring heating or cooling from HVAC systems, lighting, computer power, and the like. FIG. 2 is an illustration of power pulled from the power grid by a power consumer over time. The graph in FIG. 2 represents an actual consumption line P. The peak energy consumption time period AB is determined from the power consumer's energy usage and can typically be obtained from the power provider. The power used by the power consumer in small increments of time is averaged and plotted against time, resulting in a curve similar to the one illustrated. The peak energy consumption graph is shown as an example, and actual peak energy consumption graphs can vary differently over the time period. Peak start time A can be, for example, 8 am, while peak end time B can be 6 pm. The graph illustrates the peak energy consumption C, occurring within the peak consumption time period AB. The use of EV charging stations by these employees or customers will also occur between these hours while the employee is working or the customer is inside the power consumer.

As one example, if the power consumer is a large office complex that provides EV charging stations for its tenants driving EVs, it is likely that the largest usage of the EV charging stations will be during the daytime working hours, such as 8 am and 6 pm. The owners of the EVs using the charging stations, people who work at the large office complex, will remain at work for an extended period of time between the hours of 8 am and 6 pm. However, an EV battery can be charged in a much shorter period of time. For example, with the development of the quick charging method delivering direct current with a special connector, an EV battery can be charged in about thirty minutes. Therefore, there is significant time when an EV is available to but not using a charging station, and a comparatively insignificant time when the EV is using the charging station to charge its battery.

Figure 3:
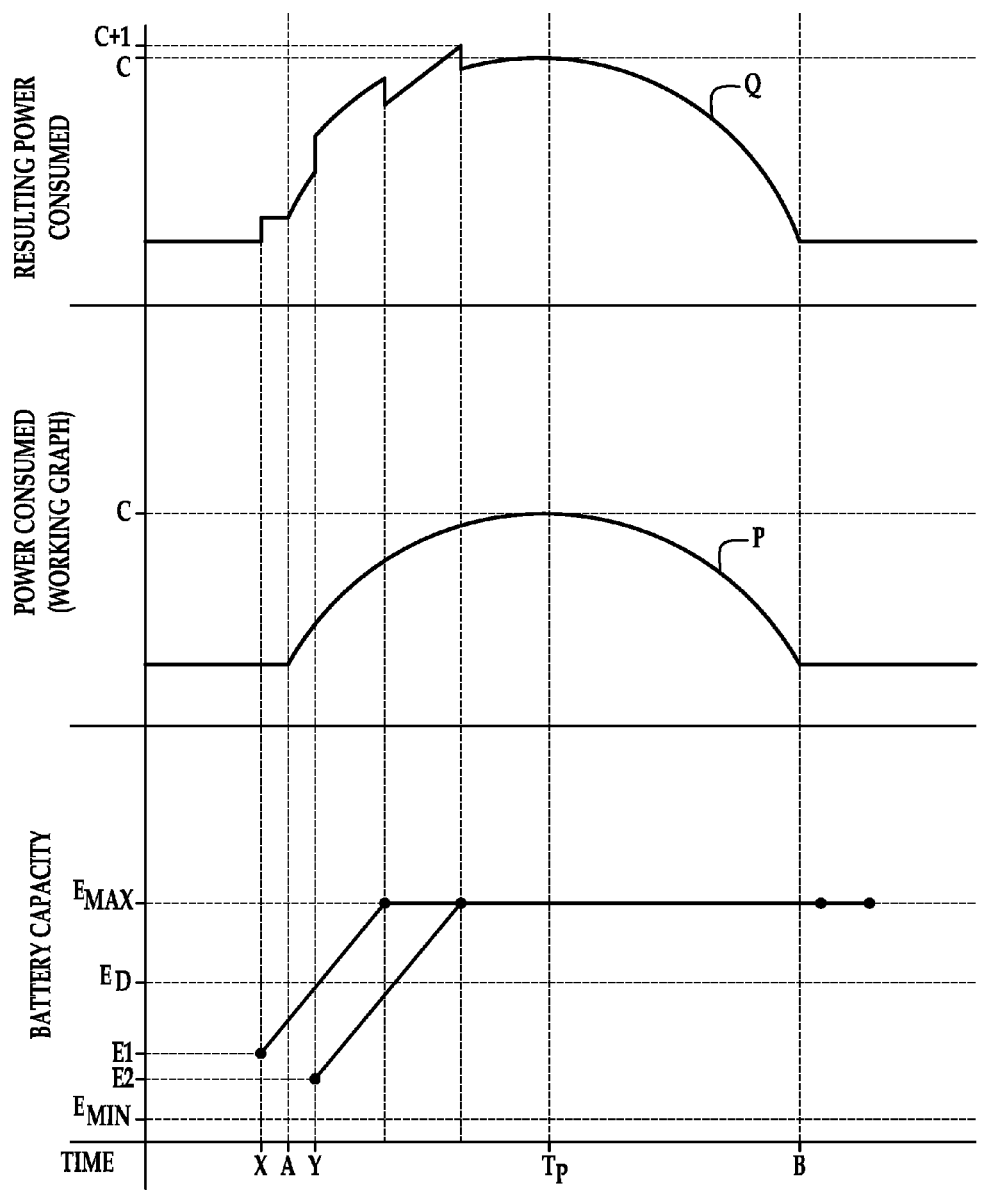
FIG. 3 is a graph illustrating the effect on power consumption and peak consumption when new EV charging stations are used.

FIG. 3 illustrates the conventional power usage when charging an EV with an EV charging station of a power consumer. EV 1 arrives and connects to the charging station at time X and is charged until the maximum capacity (or state of charge SOC) $E_{MAX}$ is reached. When EV 1 begins charging, the power usage of the power consumer increases. EV 2 arrives and begins charging at time Y, at which point the power usage of the power consumer increases again. When EV 1 is fully charged, the power usage decreases, as EV 1 is no longer drawing a charge. When EV 2 is fully charged, the power usage decreases again, back to the power consumer's actual power consumption P, with no EVs charging. FIG. 3 illustrates how the introduction of EV charging stations may increase the peak energy consumption C of a power consumer, from C to C+1, and thereby increase the fees owed by the power consumer. The examples are illustrative and one skilled in the art understands the effect of the illustrations is multiplied as the number of EVs utilizing a number of charging stations increases.

Power consumers are typically charged a penalty that increases as the peak of its energy consumption increases. The methods disclosed herein convert EV charging stations from consumers of power that increase peak energy consumption overall, and may contribute to an increase of the peak energy consumption C, to generators of power that reduce the peak energy consumption C. The methods take advantage of that time when an EV is available to, but not using, the charging station to ultimately reduce the peak energy consumption. With the methods herein, the EV can charge during charge periods up to a maximum energy amount $E_{MAX}$ and discharge to the power consumer through the EV charging station during discharging periods down to a minimum energy amount $E_{MIN}$ at variable rates during a connection time that spans at least part of the peak consumption period AB to reduce the peak energy consumption C, and sometimes the total energy consumption of the power consumer. The overall power consumption of the power consumer will increase as the charging station will pull power from the grid. However, decreasing (or maintaining at pre-EV level) the peak energy consumption will have a positive impact on the overall power spend of the power consumer.

The terms "peak shaving" and "reducing peak energy consumption" are used interchangeably herein. Also, when referring to charging and discharging the EV, it is understood to mean that the battery of the EV is charging and discharging. The methods are performed by a processor, which can be the existing processor of the charging stations preprogrammed with the methods herein or an existing processor on-board the EV.

The energy from the EVs available to reduce peak energy consumption C and the connection periods during which the EVs are connected to the charging station are unknown and will vary from day to day. Also, the EVs that use the EV charging stations must have sufficient energy capacity when the EV departs from the power consumer. The methods disclosed herein address these difficult issues.

One method of reducing peak energy consumption of a power consumer comprises discharging a battery of a vehicle to the power consumer during a peak energy consumption period having a peak energy consumption time, the power consumer configured as a charging station for the battery of the vehicle, and charging the battery to a required departure state of charge such that the battery is at the required departure state of charge at a required departure time. The vehicle is connected to the charging station of the power consumer for a period of time spanning the peak energy consumption time. The battery of the vehicle is discharged to the power consumer through the charging station over the peak energy consumption time to reduce the peak energy consumption and is charged with the charging station during one or more periods outside of the peak energy consumption time.

This method and variations thereof are described in more detail herein.

To take advantage of the energy capacity of a connected battery, the peak energy consumption time $T_P$ must occur while the EV is connected to the charging station. A connection period $T_{C/D}$ of the EV is determined from the connection time $T_C$ and the departure time $T_D$. The departure time $T_D$ can be preprogrammed. The departure time $T_D$ can be a programmed time that corresponds to the end of shift work, as a non-limiting example. The departure time $T_D$ can be set to the end of a normal work day, for example, 5 pm, so that those leaving at 5 pm or after will have the required departure energy $E_D$ at the required departure time $T_D$. The departure time $T_D$ can also be input by the owner of the EV. As a non-limiting example, if the power consumer is a retail mall providing charging stations to its customers, those customers that will be shopping for an extended period of time over the peak energy consumption period AB can input the required departure time $T_D$ so that the owner's EV will have the requisite departure energy $E_D$ when the customer is ready to leave.

Figure 4:
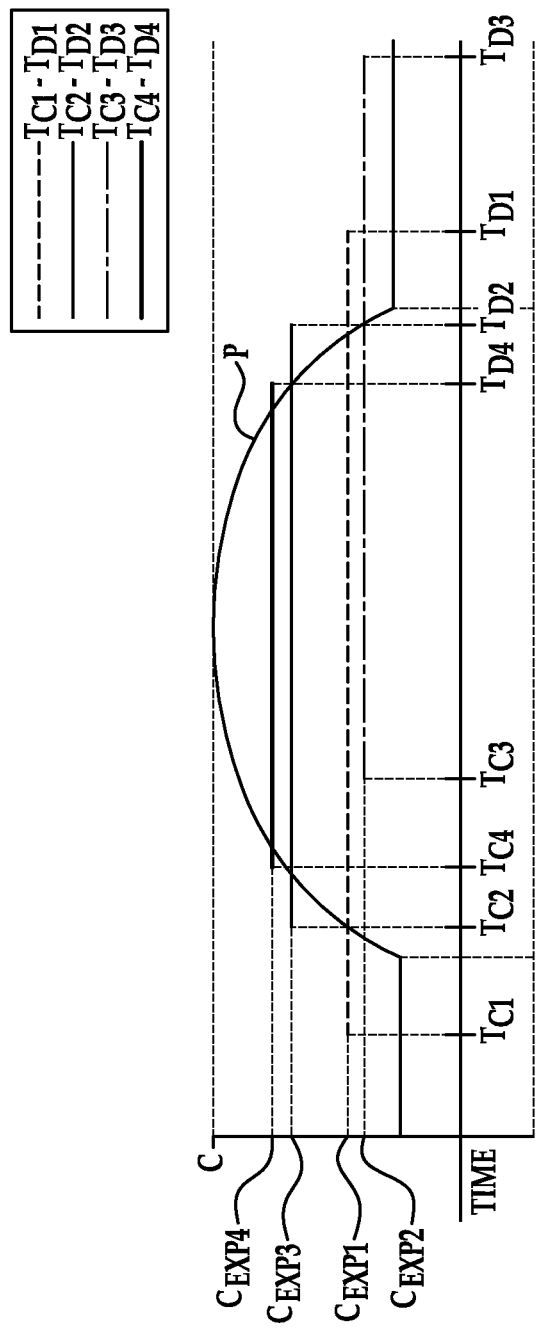
FIG. 4 is a graph illustrating various average expected consumption lines using different connection periods.

When the connection period $T_{C/D}$ is known, an average expected consumption line $C_{EXP}$ can be determined over the connection period $T_{C/D}$. The average expected consumption line $C_{EXP}$ is the average expected power consumption of the power consumer over the connection period $T_{C/D}$, including the expected actual consumption (actual consumption line P) plus the energy required to charge the vehicle to the required departure energy $E_D$. FIG. 4 illustrates four different connection periods $T_{C/D}$, 1-1, 2-2, 3-3 and 4-4, showing variance among the corresponding average expected power consumption lines $C_{EXP1}$, $C_{EXP2}$, $C_{EXP3}$, and $C_{EXP4}$. As shown, the average expected consumption line $C_{EXP}$ is a flat, constant line that will change depending on an amount of available energy $E_A$, the length of the connection period $T_{C/D}$, and the amount of overlap of the connection period $T_{C/D}$ with the peak consumption period AB.

When an EV connects to a charging station, the battery has a connection energy capacity $E_C$ at the connection time $T_C$. This connection energy capacity $E_C$ can vary greatly depending on whether the owner has the capability of charging where he or she was previously parked, the distance the owner traveled to get to the power consumer, and the like. When the EV is connected to the charging station of the power consumer, the connection time $T_C$ and connection $E_C$ are determined by the processor. As used herein, when the processor "determines," it can be measuring, receiving input, detecting, obtaining preprogrammed information, or calculating.

Typically, EV charging stations will charge the EV battery to a maximum capacity $E_{MAX}$ that can be equal to or less than 100%. The required departure energy $E_D$ can be set to an amount that represents "full" charge ($E_{MAX}$) based on conventional charging stations or some other amount less than a "full" charge. Alternatively, the required departure energy $E_D$ can be set by the owner of the EV. For example, if the owner of the EV has a charging station at home and lives nearby, the owner may choose to set the required departure energy $E_D$ at a percentage lower than the "full" charge. The "full" charge can be a default required departure energy $E_D$, with the user able to change the default setting if desired.

Knowing the actual consumption line P, the connection energy $E_C$, and the required departure energy $E_D$, the available energy $E_A$ can be determined from their difference ($E_A = E_D - E_C$). A charge line $L_C$ and a discharge line $L_D$ can both be initially set to be equal to the average expected consumption line $C_{EXP}$, and then can be adjusted based on a deficiency in the available energy $E_A$ and/or the connection period $T_{C/D}$ to achieve the maximum peak shaving effect while preserving at least the required departure energy $E_D$ by the departure time $T_D$. The average expected consumption line can be $C_{EXP}$ calculated from the following equation (1):

$$L_C = L_D = C_{EXP} = (E_A/T_{C/D}) + P_{AVG}, \text{ wherein} \quad (1)$$

$E_A = E_d - E_c$;
$T_{C/D} = T_D - T_C$; and
$P_{AVG}$ = average of the actual consumption line P across the connection period $T_{C/D}$.

The average expected consumption line $C_{EXP}$, the charge line $L_C$, and the discharge line $L_D$ are plotted against the actual consumption line P. The rate and the timing of charging are determined from the difference between the charge line $L_C$ and the actual consumption line P, and the rate and timing of discharging is determined from the difference between the discharge line $L_D$ and the actual consumption line P. The battery is charged during charging periods (e.g. $T_{CH1}$ and $T_{CH2}$ as discussed herein) when the difference between the charge line $L_C$ and the actual consumption line P ($L_C$–P) is positive. The battery is discharged during discharging periods (e.g. $T_{DIS}$ as discussed herein) when the difference between the discharge line $L_D$ and the actual consumption line P ($L_D$–P) is negative. Also, charging and discharging of the battery can be idled during idling periods (e.g. $T_{X1}$ and $T_{X2}$ as discussed herein) between charging and discharging periods.

Figure 5:
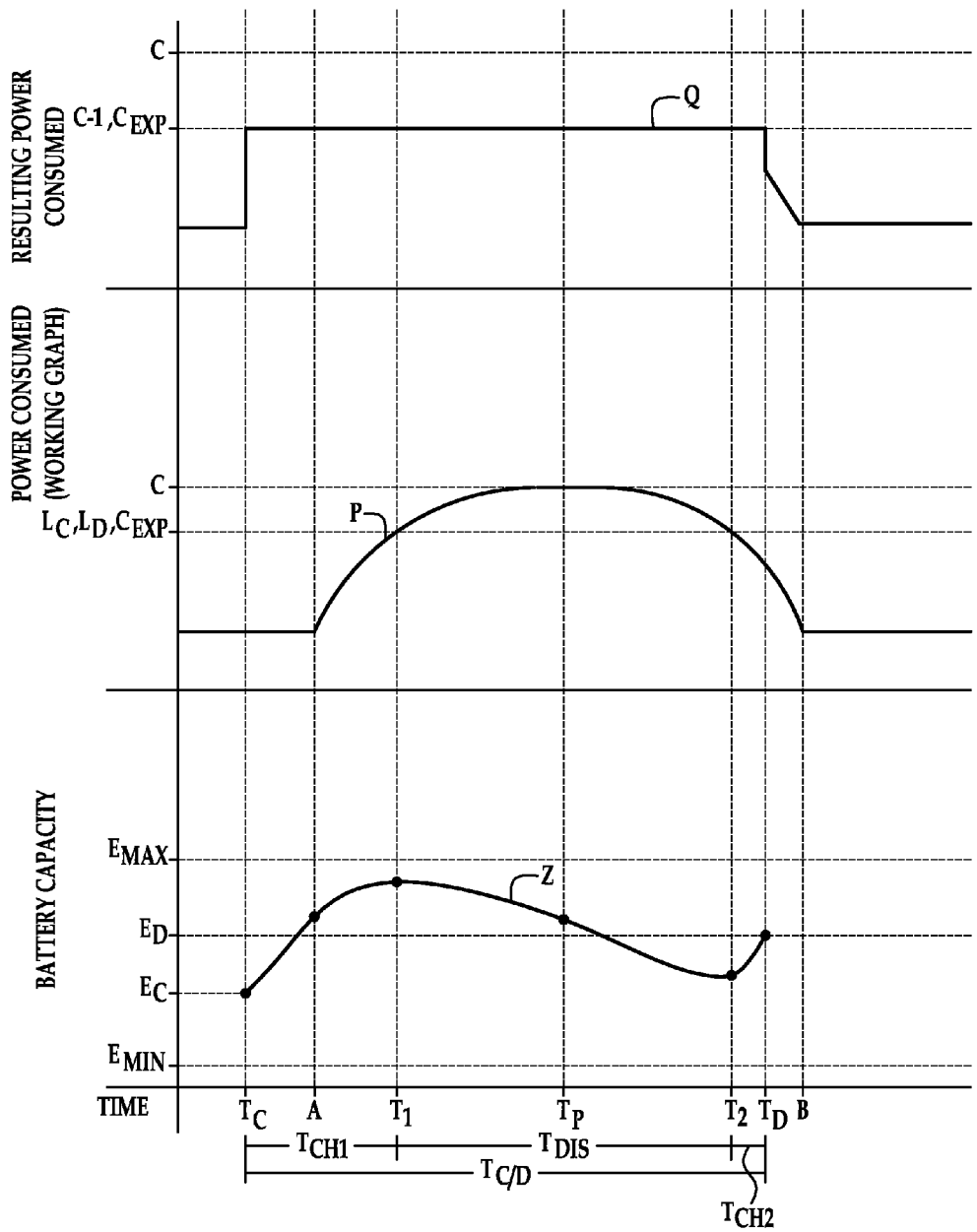
FIG. 5 is a graph illustrating an aspect of a method of peak shaving as disclosed herein.

FIG. 5 illustrates the method described. The EV connects to the charging station at $T_C$ with a connection energy capacity $E_C$ as shown. The departure time $T_D$ and required departure energy $E_D$ are determined, for example, by input from the EV user. The average expected consumption line $C_{EXP}$ is calculated and plotted against the actual consumption line P. The charge line $L_C$ and the discharge line $L_D$ are initially set to be equal to the average expected consumption line $C_{EXP}$. Charging periods $T_{CH1}$ and $T_{CH2}$ are set based on where the charge line $L_C$ crosses the actual consumption line P. Discharging period $T_{DIS}$ is set based on where the discharge line $L_D$ crosses the actual consumption line P. A predicted battery capacity line Z is then plotted based on the difference between the charge line $L_C$ and the actual consumption line P, and the difference between the discharge line $L_D$ and the actual consumption line P.

As noted above, the battery is discharged when the difference between the discharge line $L_D$ and the actual consumption line P is negative and charged when the difference between the charge line $L_C$ and the actual consumption line P is positive. As shown in FIG. 5, at time $T_C$, the difference between the charge line $L_C$ and the actual consumption line P is positive. Therefore, charging of the EV battery begins when the EV is connected, at time $T_C$. The rate of charge changes dynamically based on the difference between the charge line $L_C$ and the actual consumption line P. Between the connection time $T_C$ and the peak start time A, the difference is constant, so the charge rate is linear. At the peak start time A, the difference between the charge line $L_C$ and the actual consumption line P changes dynamically as the actual consumption line P changes.

At time $T_1$, the charge line $L_C$ and the discharge line $L_D$ cross the actual consumption line P, so the difference between the charge line $L_C$ and the actual consumption line P and the difference between the discharge line $L_D$ and the actual consumption line P become negative. As shown by the predicted battery capacity curve Z, the battery ceases charging and begins to discharge its capacity to the power consumer through the charging station. The discharge rate is also dynamically calculated based on the difference between the discharge line $L_D$ and the actual consumption line P. The battery is discharged until time $T_2$, at which point the charge line $L_C$ and the discharge line $L_D$ cross the actual consumption line P, so the difference between charge line $L_C$ and the actual consumption line P and the difference between the charge line $L_C$ and the actual consumption line P become positive again. As shown by the predicted battery capacity curve Z, the battery stops discharging and begins receiving charge again from time $T_2$ until the departure time $T_D$. At the departure time $T_D$, the EV battery is predicted to have the required departure energy $E_D$ so that the EV user can leave the power consumer with sufficient battery capacity to arrive at his or her next destination.

As seen in FIG. 5, the required departure energy $E_D$ can be achieved at departure time $T_D$, so the charge line $L_C$ and the discharge line $L_D$ can remain equal to the average expected consumption line $C_{EXP}$. As shown by the resulting power consumption line Q, the peak energy consumption C has been reduced to C-1 by determining the optimal times to charge and discharge the EV while discharging the EV across the peak consumption time $T_P$. In this case, since the available energy $E_A$ from the EV battery and the connection period $T_{C/D}$ are sufficient, the maximum peak shaving effect can be achieved, thereby reducing the peak energy consumption to the lowest achievable amount, which is equal to the average expected consumption line $C_{EXP}$.

Figure 6:
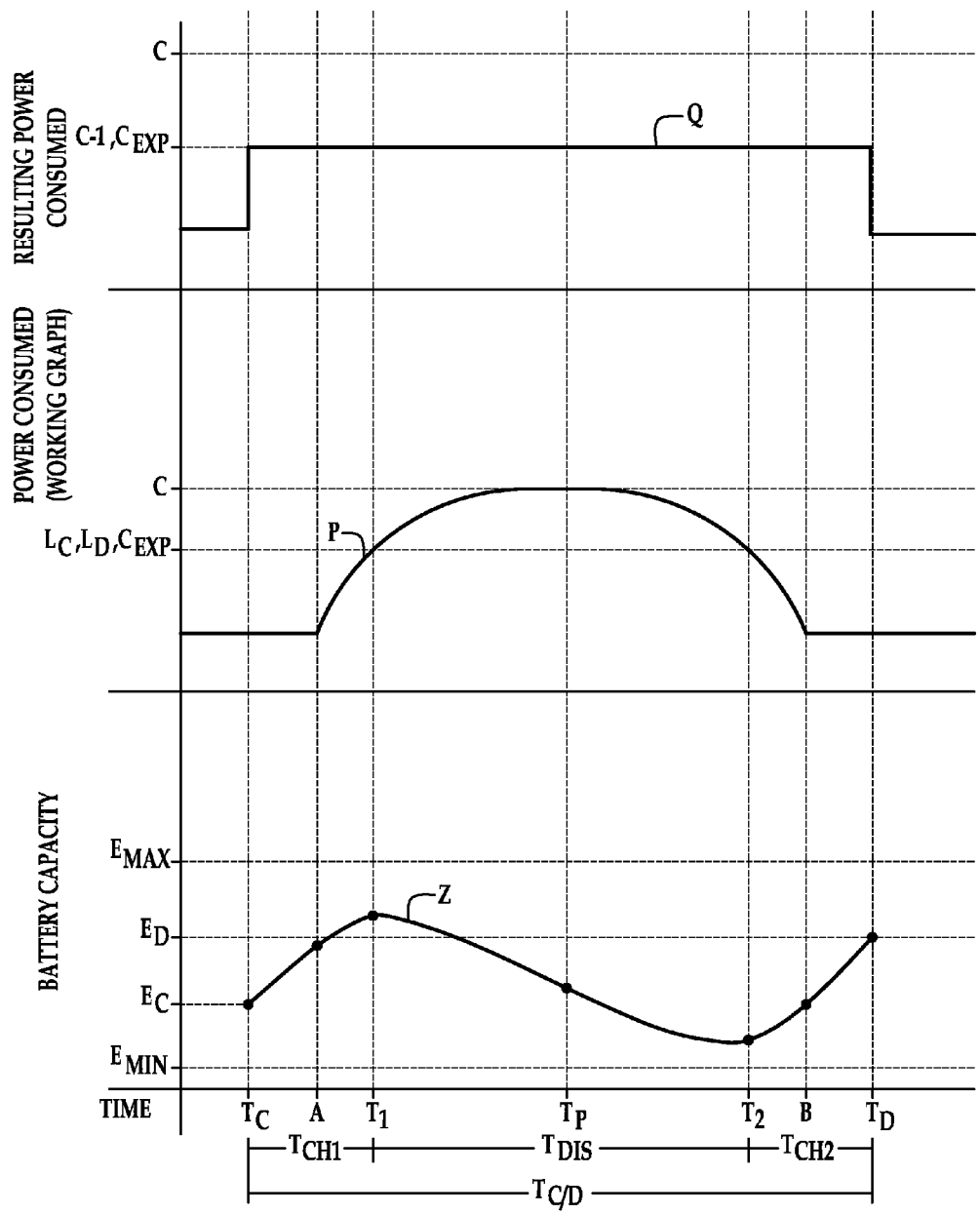
FIG. 6 is a graph illustrating an aspect of the method of peak shaving as disclosed herein.

FIG. 6 illustrates a similar example of the method as that shown in FIG. 5, except the connection period $T_{C/D}$ in FIG. 6 is longer. Because the available energy $E_A$ has not changed but the connection period $T_{C/D}$ has increased, the average expected consumption line $C_{EXP}$ is lower than in FIG. 5. Between the connection time $T_C$ and the peak start time A, the difference between the charge line $L_C$ and the actual consumption line P is positive and constant, so the charge rate is linear, but because the difference between the charge line $L_C$ and the actual consumption line P is smaller, the rate is less than the rate shown in FIG. 5. At the peak start time A, the difference between the charge line $L_C$ and the actual consumption line P changes dynamically as the actual consumption line P changes. $T_1$ occurs earlier in FIG. 6 than in FIG. 5, and the battery capacity at time $T_1$ is lower in FIG. 6 than in FIG. 5.

At time $T_1$, the charge line $L_C$ and the discharge line $L_D$ cross the actual consumption line P, so the difference between charge line $L_C$ and the actual consumption line P and the difference between the discharge line $L_D$ and the actual consumption line P become negative. As shown by the predicted battery capacity curve Z, the battery ceases charging and begins to discharge its capacity to the power consumer through the charging station. The discharge rate is greater than that shown in FIG. 5 because the absolute value of the difference between the discharge line $L_D$ and the actual consumption line P is greater than that in FIG. 5.

The battery is discharged until time $T_2$, at which point the charge line $L_C$ and the discharge line $L_D$ cross the actual consumption line P, so the difference between charge line $L_C$ and the actual consumption line P and the difference between the charge line $L_C$ and the actual consumption line P become positive again. As shown by the predicted battery capacity curve Z, the battery stops discharging and begins receiving charge again until the departure time $T_D$. Because the departure time $T_D$ is later than the peak end time B, the rate of charge becomes constant at the peak end time B as the difference between the charge line $L_C$ and the actual consumption line P becomes constant. At the departure time $T_D$, the EV battery has the required departure energy $E_D$ and can leave the power consumer with sufficient battery capacity to arrive at its next destination.

As seen in FIG. 6, the required departure energy $E_D$ can be achieved at departure time $T_D$, so the charge line $L_C$ and the discharge line $L_D$ can remain equal to the average expected consumption line $C_{EXP}$. As shown by the resulting power consumption line Q, the peak energy consumption C has been reduced to C-1 by determining the optimal times to charge and discharge the EV while discharging the EV across the peak consumption time $T_P$. In this case, since the available energy $E_A$ from the EV battery and the connection period $T_{C/D}$ are sufficient, the maximum peak shaving effect can be achieved, thereby reducing the peak energy consumption to the lowest achievable amount, which is equal to the average expected consumption amount $C_{EXP}$. $C_{EXP}$ of FIG. 6 is lower than $C_{EXP}$ of FIG. 5 because the battery could discharge to the power consumer for a longer discharging period as the battery had more time to charge, even though the EV arrived with the same capacity.

Figure 7:
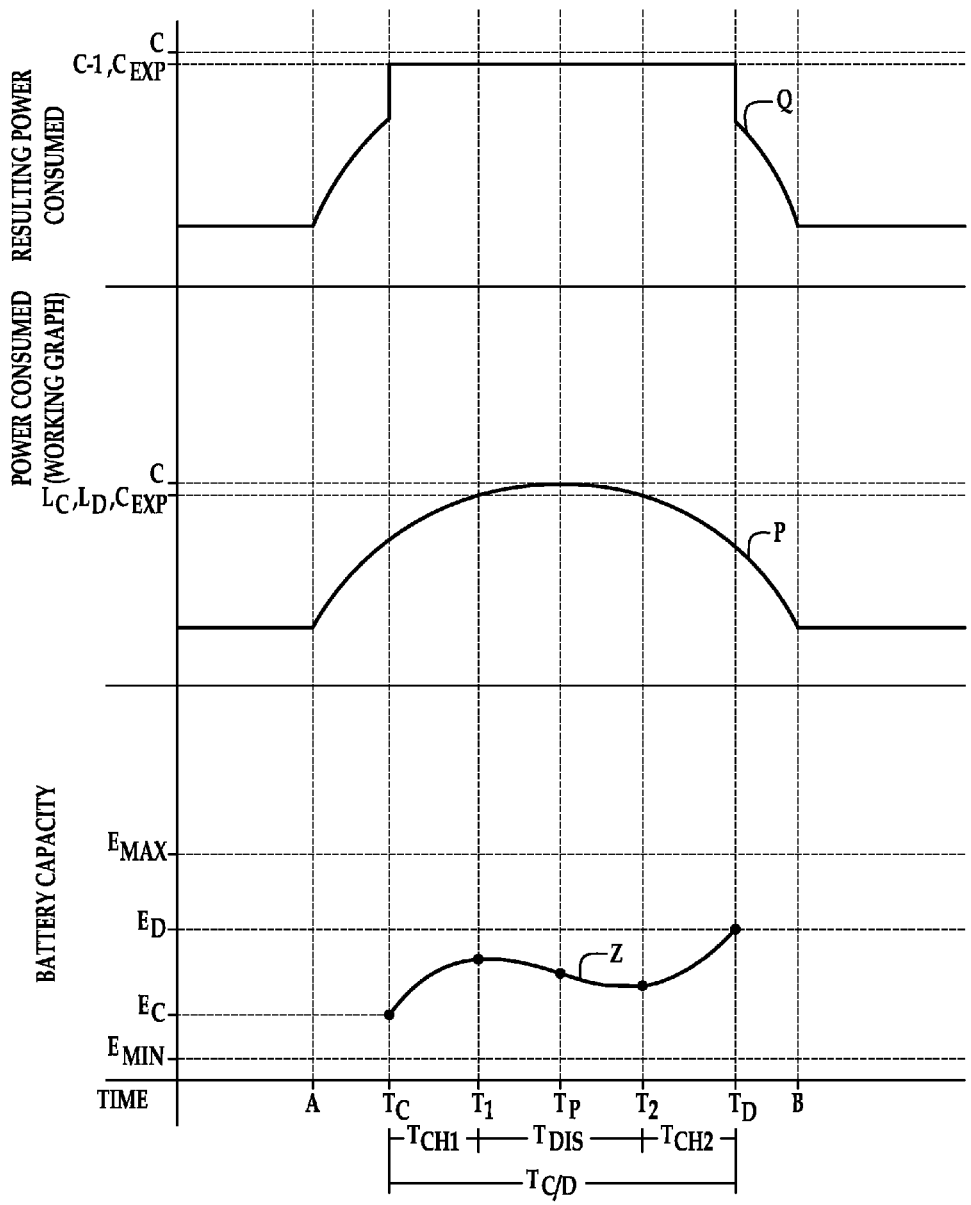
FIG. 7 is a graph illustrating an aspect of the method of peak shaving as disclosed herein.

FIG. 7 illustrates another example of the method using yet another connection period $T_{C/D}$. Because the connection energy $E_C$ has not changed but the connection period $T_{C/D}$ has decreased, the average expected consumption line $C_{EXP}$ during the connection period $T_{C/D}$ is much higher on the power axis. The connection time $T_C$ in FIG. 7 is after the peak start time A. At the connection time $T_C$, the difference between the charge line $L_C$ and the actual consumption line P is positive and changes dynamically as the actual consumption line P changes.

At time $T_1$, the charge line $L_C$ and the discharge line $L_D$ cross the actual consumption line P, so the difference between charge line $L_C$ and the actual consumption line P and the difference between the discharge line $L_D$ and the actual consumption line P become negative. As shown by the predicted battery capacity curve Z, the battery begins to discharge its capacity to the power consumer through the charging station at time $T_1$. The discharge rate is low because the absolute value of the difference between the discharge line $L_D$ and the actual consumption line P is small.

The battery is discharged until time $T_2$, at which point the charge line $L_C$ and the discharge line $L_D$ cross the actual consumption line P, so the difference between charge line $L_C$ and the actual consumption line P and the difference between the charge line $L_C$ and the actual consumption line P become positive again. As shown by the predicted battery capacity curve Z, the battery stops discharging and begins receiving charge again at time $T_2$ until the departure time $T_D$. Because the departure time $T_D$ is before the peak end time B, the rate of charge is dynamically changing as the difference between the discharge line $L_D$ and the actual consumption line P is dynamically changing. At the departure time $T_D$, the EV battery has the required departure energy $E_D$ and can leave the power consumer with sufficient battery capacity to arrive at its next destination.

As seen in FIG. 7, the required departure energy $E_D$ can be achieved at departure time $T_D$, so the charge line $L_C$ and the discharge line $L_D$ can remain equal to the average expected consumption line $C_{EXP}$. As shown by the resulting power consumption line Q, the peak energy consumption C has been reduced to C-1 by determining the optimal times to charge and discharge the EV while discharging the EV over the peak consumption time $T_P$. In this case, since the available energy $E_A$ from the EV battery and the connection period $T_{C/D}$ are sufficient, the maximum peak shaving effect can be achieved, thereby reducing the peak energy consumption to the lowest achievable amount, which is equal to the average expected consumption amount $C_{EXP}$. $C_{EXP}$ of FIG.

7 is only slightly less than C because the battery had the same capacity, but less time to charge than in the scenarios of FIGS. 5 and 6.

Figure 8:
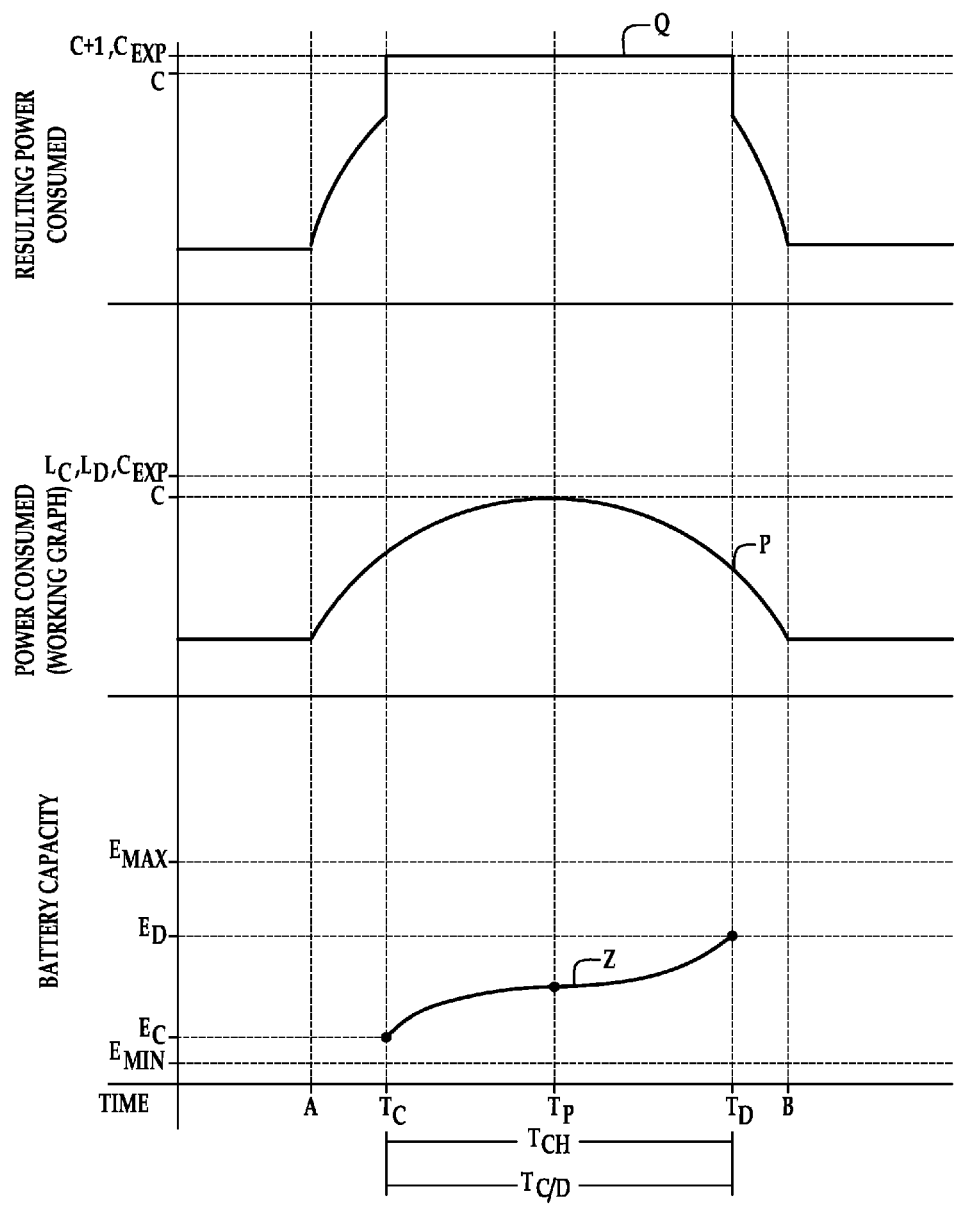
FIG. 8 is a graph illustrating an aspect of the method of peak shaving as disclosed herein.

FIG. 8 illustrates another example of the method. In FIG. 8, the connection period $T_{C/D}$ is the same as that shown in FIG. 7. However, the EV's connection energy capacity $E_C$ is lower than that shown in FIG. 7. Because the connection energy $E_C$ decreased, but the connection period $T_{C/D}$ has stayed the same, the average expected consumption line $C_{EXP}$ during the connection period $T_{C/D}$ is increased to be above the peak energy consumption C.

The connection time $T_C$ in FIG. 8 is after the peak start time A. At the connection time $T_C$, the difference between the charge line $L_C$ and the actual consumption line P is positive and changes dynamically as the actual consumption line P changes. However, the charge line $L_C$ and the discharge line $L_D$ never cross the actual consumption line P, so the difference between discharge line $L_D$ and the actual consumption line P and the difference between the charge line $L_C$ and the actual consumption line P remain positive throughout the connection period $T_{C/D}$. Therefore, the battery is continually being charged at a dynamically changing rate throughout the entire connection period $T_{C/D}$.

As seen in FIG. 8, the peak energy consumption C has been increased to C+1 because the connection period $T_{C/D}$ did not provide sufficient time to allow the battery to discharge during the connection period $T_{C/D}$ while providing the required departure energy $E_D$ for the EV. Unfortunately, as shown by the resulting power consumption line Q in this case, the maximum achievable peak shaving effect is only to maintain the peak energy consumption C+1 at the average expected consumption line $C_{EXP}$, which is above the peak energy consumption C of the actual consumption line P. Even though the peak energy consumption C+1 is above the peak energy consumption C of the actual consumption line P, a peak shaving effect is still realized in that if the battery were to be charged at a higher rate during the connection period, the peak may have actually been driven above even the peak energy consumption C+1 achieved by this method.

In FIG. 9A, the method is again performed, with the average expected consumption line $C_{EXP}$ determined and plotted against the actual consumption line P, and the charge line $L_C$ and the discharge line $L_D$ initially set to be equal to the average expected consumption line $C_{EXP}$. At the connection time $T_C$, the difference between the charge line $L_C$ and the actual consumption line P is positive and changes dynamically as the actual consumption line P changes.

At time $T_1$, the charge line $L_C$ and the discharge line $L_D$ cross the actual consumption line P, so the difference between charge line $L_C$ and the actual consumption line P and the difference between the discharge line $L_D$ and the actual consumption line P become negative. As shown by the predicted battery capacity curve Z, the battery ceases charging at time $T_1$ and begins to discharge its capacity to the power consumer through the charging station. Because the connection time $T_C$ and time $T_1$ are near each other, there is little time to charge the battery during the first charging period $T_{CH1}$ before the discharging period $T_{DIS}$ begins at time $T_1$. Because the EV is connected to the charging station with a low connection energy capacity $E_C$, the battery is fully discharged to the minimum energy $E_{MIN}$ before the end of the discharging period $T_{DIS}$, where it will remain until the next charging period $T_{CH2}$ begins at time $T_2$.

Figure 9A:
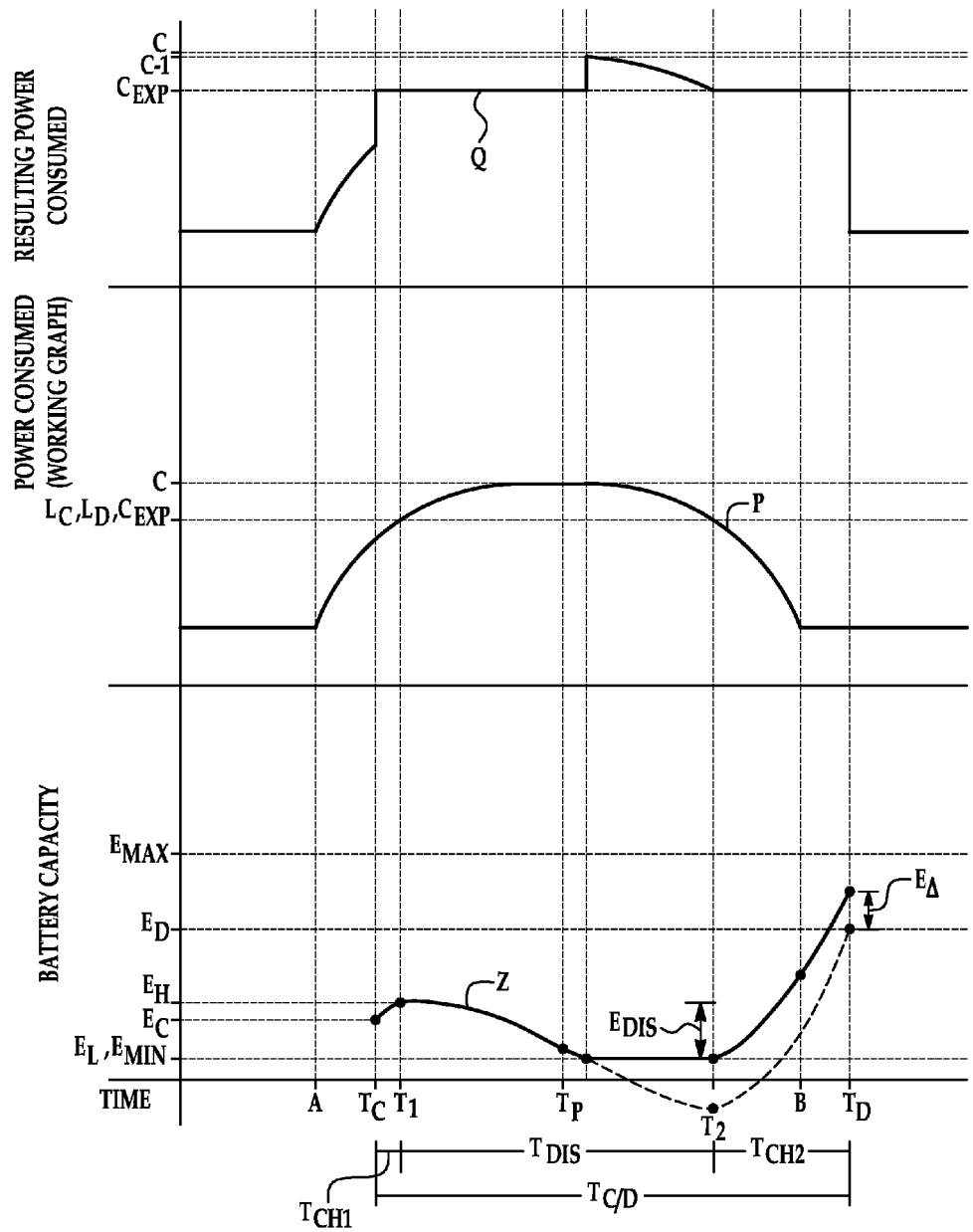
FIGS. 9A and 9B are graphs illustrating an aspect of the method of peak shaving when a predicted battery capacity is at a minimum threshold during a discharging period as disclosed herein.

As shown by the broken line at the bottom of FIG. 9A, if the battery capacity was not limited to discharging to $E_{MIN}$, the maximum peak shaving effect could have been achieved by reducing the peak energy consumption C to $C_{EXP}$ while achieving the required departure energy $E_D$ at the departure time $T_D$. However, since the predicted battery capacity curve Z must remain at $E_{MIN}$ until time $T_2$, the peak shaving effect is limited, and the battery will charge to a capacity larger than $E_D$ at departure time $T_D$. The resulting power consumption line Q in FIG. 9A follows the actual consumption line P from the time the predicted battery capacity curve Z reaches $E_{MIN}$. While the peak energy consumption C is reduced to C−1, a greater peak shaving effect can be achieved.

As shown in FIG. 9A, if the battery is at the minimum energy $E_{MIN}$, and not between the maximum energy $E_{MAX}$ and the minimum energy $E_{MIN}$, it is not discharging during the entire discharging period $T_{DIS}$. Therefore, even though the required departure energy $E_D$ could be achieved by departure time $T_D$, the peak energy consumption C would not be reduced due to this energy transfer deficiency.

To address this situation, the following steps are taken. A maximum energy $E_H$ is determined at time $T_1$ and a minimum energy $E_L$ is determined at time $T_2$. An available discharge energy $E_{DIS}$ is determined by the difference between the maximum energy $E_H$ and the minimum energy $E_L$ ($E_{DIS}=E_H-E_L$).

Figure 9B:
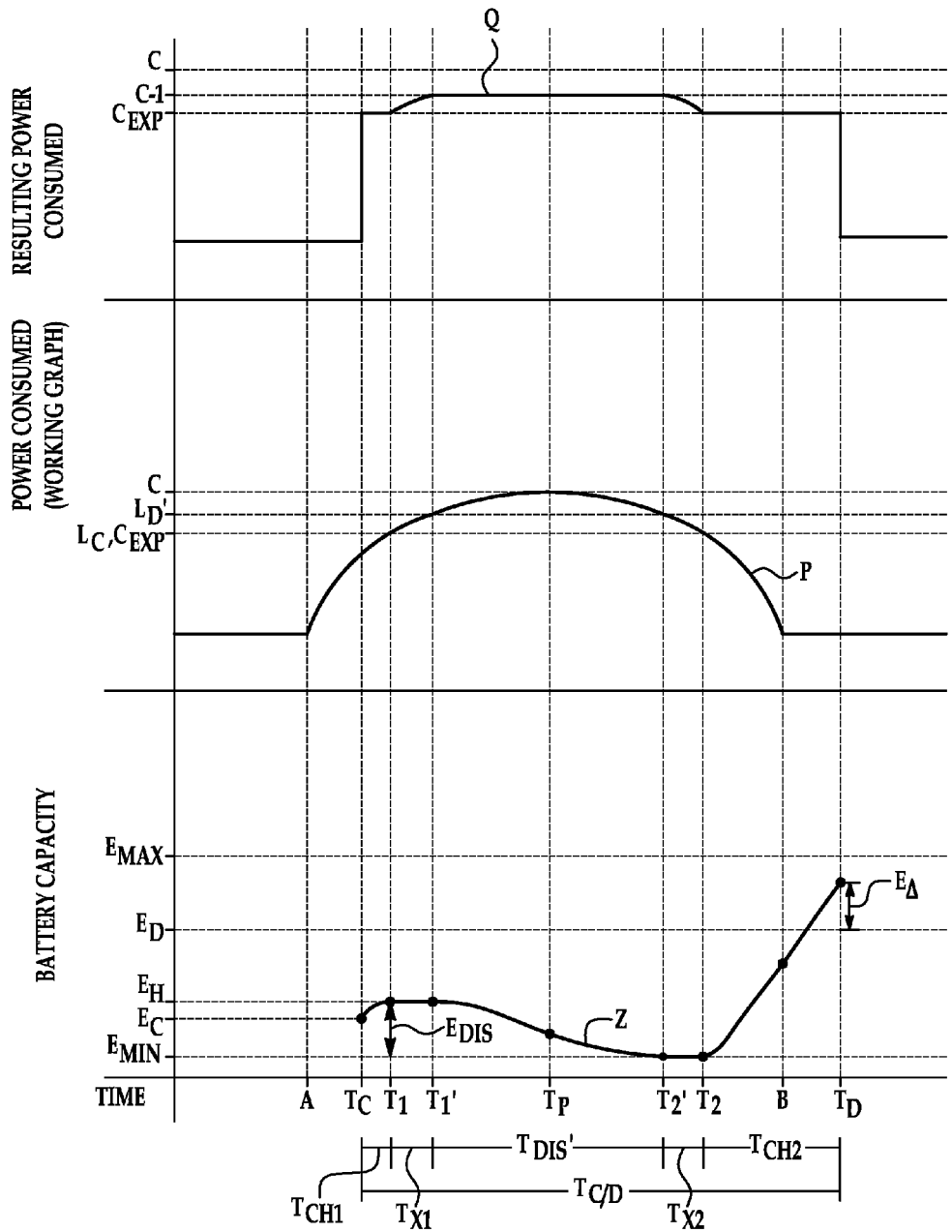

One way to ensure that the battery is discharging during the discharging period $T_{DIS}$, thus achieving a maximum peak shaving effect, is to reduce the time spent discharging to a revised discharging period $T_{DIS'}$ that is less than $T_{DIS}$ ($T_{DIS}=T_2-T_1$). Reducing the discharging period $T_{DIS}$ to the revised discharging period $T_{DIS'}$ ($T_{DIS'}=T_{2'}-T_{1'}$), as shown in FIG. 9B, would also reduce the discharge rate, so that the battery is still discharging across the peak consumption time $T_P$. Therefore, the discharging period $T_{DIS}$ is adjusted by moving the discharge line $L_D$ higher than the average expected consumption line $C_{EXP}$ until the difference between the average expected consumption line $C_{EXP}$ and the revised discharge line $L_{D'}$ during the revised discharging period $T_{DIS'}$ from time $T_{1'}$ to time $T_{2'}$ plus the difference between the actual consumption line P and the average expected consumption line $C_{EXP}$ during the idle period $T_{X1}$ from time $T_1$ to time $T_{1'}$ and the idle period $T_{X2}$ from time $T_{2'}$ to time $T_2$ (or $T_D$, whichever occurs earlier) equals the departure energy difference $E_A$. The revised discharging period $T_{DIS'}$ is a period when the difference between the revised discharge line $L_{D'}$ and the actual consumption line P is negative. Alternatively, the revised discharge line $L_{D'}$ can be moved until the difference between the actual consumption line P and the revised discharge line $L_{D'}$ during the revised discharging period $T_{DIS'}$ equals the available discharge energy $E_{DIS}$. Movement of the revised discharge line $L_{D'}$ and the corresponding calculation can be iterated until the equation is solved.

FIG. 9B illustrates movement of the discharge line $L_D$ higher than the average expected consumption line $C_{EXP}$. When the equation is solved and the revised discharge line $L_{D'}$ is positioned, a new time $T_{1'}$ and new time $T_{2'}$ can be determined from where the revised discharge line $L_{D'}$ crosses the actual consumption line P. With the revised discharge line $L_{D'}$ calculated, the new charging periods (e.g. $T_{CH1}$ and $T_{CH2}$), discharging periods (e.g. $T_{DIS'}$), and idling periods (e.g. $T_{X1}$ and $T_{X2}$) are determined. Because the difference between the charge line $L_C$ and the actual consumption line P is positive at the connection time $T_C$, charging begins at the connection time $T_C$. Charging occurs until time $T_1$ is reached where the charge line $L_C$ crosses the actual consumption line P and the difference between the charge line $L_C$ and the actual consumption line P becomes negative. At time $T_1$, the maximum energy $E_H$ is obtained.

An idling period $T_{X1}$ is set between time $T_1$ and $T_{1'}$, so discharging of the battery to the power consumer is delayed until the revised discharge line $L_{D'}$ crosses the actual consumption line P, and the difference between the revised discharge line $L_{D'}$ and the actual consumption line P becomes negative, at time $T_{1'}$. Discharging takes place during the revised discharging period $T_{DIS'}$ at a rate that is based on the difference between the revised discharge line $L_{D'}$ and the actual consumption line P. When time $T_{2'}$ is reached, where the revised discharge line $L_{D'}$ crosses the actual consumption line P, and the difference between the revised discharge line $L_{D'}$ and the actual consumption line P becomes positive again, discharging stops. At time $T_{2'}$, the battery capacity is at the minimum energy $E_L$. A second idling period $T_{X2}$ is set between time $T_{2'}$ and $T_2$, so charging is delayed until time $T_2$ is reached, where the charge line $L_C$ crosses the actual consumption line P, and the difference between the charge line $L_C$ and the actual consumption line P becomes positive again. At time $T_2$, charging begins and continues until the departure time $T_D$ at a rate that is based on the difference between the charge line $L_C$ and the actual consumption line P as in the previous examples.

As seen in FIG. 9B, the charging periods $T_{CH1}$ and $T_{CH2}$ are based on the originally calculated charge line $L_C$, and the revised discharging period $T_{DIS'}$ is based on the revised discharge line $L_{D'}$. Additionally, the idling periods $T_{X1}$ and $T_{X2}$ are positioned between sequential ones of charging and discharging periods. As shown by the resulting power consumption line Q in FIG. 9B, the peak energy consumption C is reduced to C-1, which is larger than $C_{EXP}$. Although the maximum peak shaving effect cannot be achieved, where the reduced peak energy consumption C-1 is equal to the average expected consumption line $C_{EXP}$, the peak shaving effect is maximized as much as possible by adjusting the discharge line $L_D$ so that the battery is still discharging during the entire revised discharging period $T_{DIS'}$, while still achieving the required departure energy $E_D$ by the departure time $T_D$.

Figure 10:
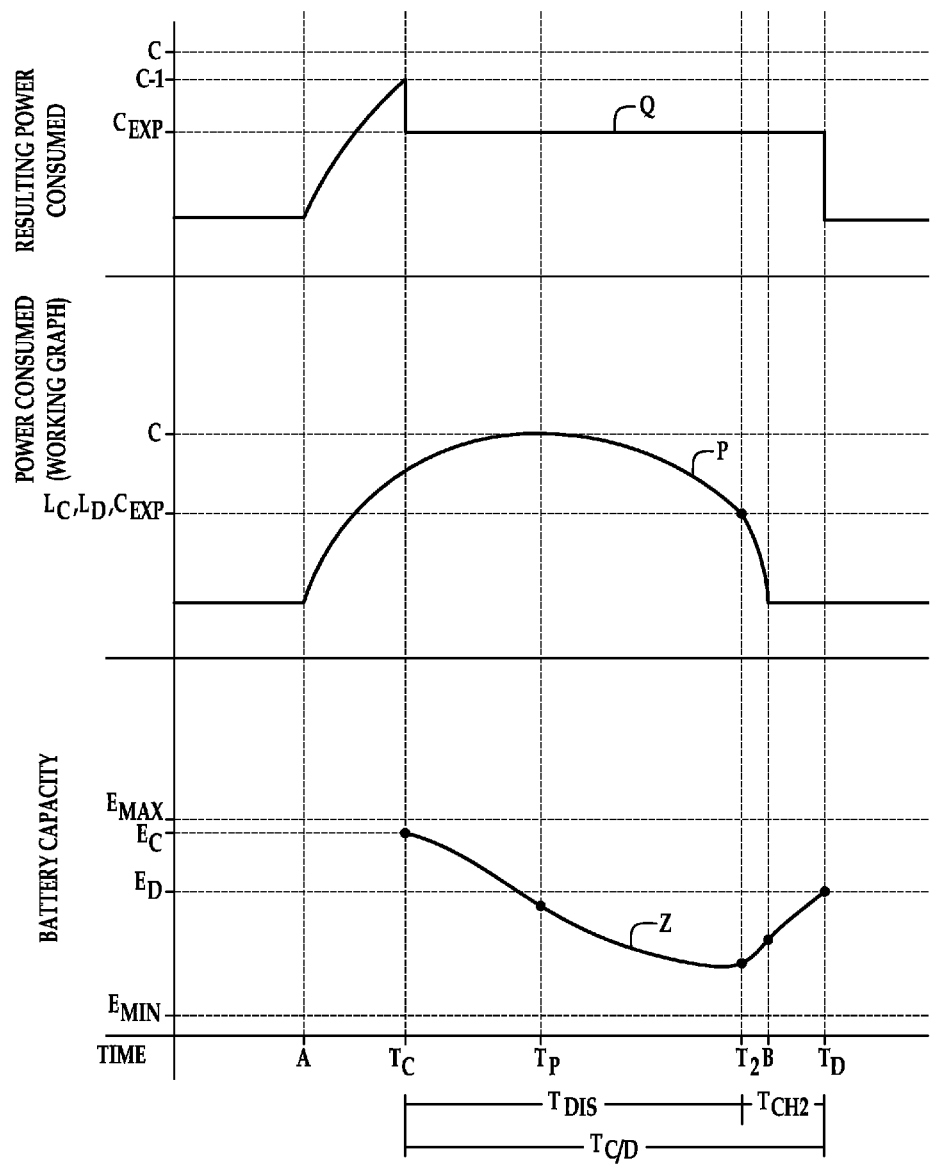
FIG. 10 is a graph illustrating an aspect of the method of peak shaving as disclosed herein.

In FIG. 10, the EV connects to the charging station at connection time $T_C$ with a large connection energy capacity $E_C$ as shown. The departure time $T_D$ is determined, for example, by preprogramming or by input from the EV user. The average expected consumption line $C_{EXP}$ is calculated. The charge line $L_C$ and the discharge line $L_D$ are set to be equal to the average expected consumption line $C_{EXP}$ and the charge line $L_C$, the discharge line $L_D$, and the average expected consumption line $C_{EXP}$ are plotted against the actual consumption line P. The average expected consumption line $C_{EXP}$ during the connection period $T_{C/D}$ is lower along the power axis than in FIGS. 5 and 6 because the EV arrived with connection energy $E_C$ that is higher than the required departure energy $E_D$.

As shown in FIG. 10, the EV connected to the charging station at connection time $T_C$ that is after peak start time A, and the discharge line $L_D$ is already below the actual consumption line P. As noted above, the battery is discharged when the difference between the discharge line $L_D$ and the actual consumption line P is negative and charged when the difference between the charge line $L_C$ and the actual consumption line P is positive. As shown in FIG. 10, at connection time $T_C$, the difference between the discharge line $L_D$ and the actual consumption line P is negative. Therefore, discharging of the EV battery begins when the EV is connected at connection time $T_C$. The rate of discharge changes dynamically based on the difference between the discharge line $L_D$ and the actual consumption line P.

At time $T_2$, the charge line $L_C$ and the discharge line $L_D$ cross the actual consumption line P, so the difference between the discharge line $L_D$ and the actual consumption line P and the difference between the charge line $L_C$ and the actual consumption line P become positive. As shown by the predicted battery capacity curve Z, the battery stops discharging at time $T_2$ and begins receiving charge until the departure time $T_D$. At the departure time $T_D$, the EV battery has the required departure energy $E_D$ and can leave the power consumer with sufficient battery capacity to arrive at its next destination.

As seen in FIG. 10, the required departure energy $E_D$ can be achieved at departure time $T_D$, so the charge line $L_C$ and the discharge line $L_D$ can remain equal to the average expected consumption line $C_{EXP}$. As shown by the resulting power consumption line Q in FIG. 10, the peak energy consumption C has been reduced to C-1. However, since the connection time $T_C$ occurred so far past the peak start time A, the peak C-1 reached in FIG. 10 is larger than the average expected consumption line $C_{EXP}$. Although the maximum peak shaving effect could not be achieved, the effect is maximized by preventing the peak from rising farther than the peak C-1 reached at connection time $T_C$, while still achieving the required departure energy $E_D$ by departure time $T_D$.

Figure 11A:
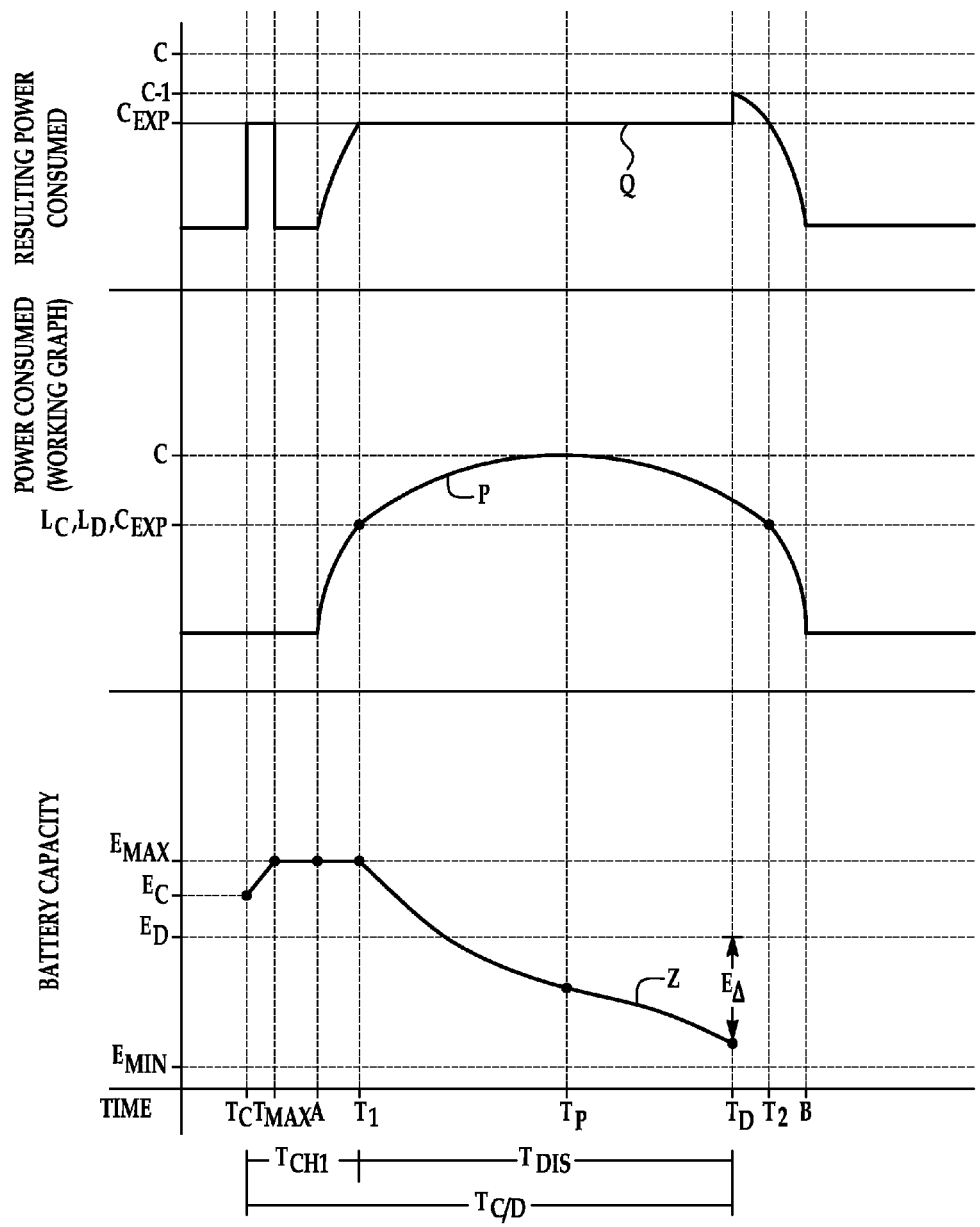
FIGS. 11A and 11B are graphs illustrating an aspect of the method of peak shaving when the predicted battery capacity at the departure time is below a required departure energy as disclosed herein.

In FIG. 11A, the EV connects to the charging station at connection time $T_C$ with a connection energy capacity of $E_C$ as shown. The departure time $T_D$ is determined, for example, by preprogramming or input from the EV user. The average expected consumption line $C_{EXP}$ is calculated. The charge line $L_C$ and the discharge line $L_D$ are set to be equal to the average expected consumption line $C_{EXP}$, and the charge line $L_C$, the discharge line $L_D$, and the average expected consumption line $C_{EXP}$ are plotted against the actual consumption line P. The average expected consumption line $C_{EXP}$ is lower along the power axis than in FIGS. 5 and 6 because the EV arrived with connection energy $E_C$ that is higher than the required departure energy $E_D$.

However, charging and discharging based on the charge line $L_C$ and the discharge line $L_D$ that are both equal to the average expected consumption line $C_{EXP}$ would result in lower departure energy at departure time $T_D$ than the required departure energy $E_D$, as shown by the predicted battery capacity curve Z in FIG. 11A. Additional steps can be taken to ensure that the required departure energy $E_D$ is obtained by departure time $T_D$ in this situation.

A departure energy difference $E_A$ is determined by calculating the difference between the required departure energy $E_D$ and the lower predicted departure energy. The discharge line $L_D$ is moved higher than the average expected consumption line $C_{EXP}$ until the difference between the average expected consumption line $C_{EXP}$ and the revised discharge line $L_{D'}$ during the revised discharging period $T_{DIS'}$, plus the difference between the actual consumption line P and the average expected consumption line $C_{EXP}$ during the idle period $T_{X1}$ from time $T_1$ to time $T_{1'}$ and the idle period $T_{X2}$ from time $T_{2'}$ to time $T_2$ (or $T_D$, whichever occurs earlier) equals the departure energy difference $E_A$. The revised discharging period $T_{DIS'}$ is a period that the revised discharge line $L_{D'}$ is below the actual consumption line P, and thus the difference between the revised discharge line $L_{D'}$ and the actual consumption line P is negative.

As discussed above, the discharge line $L_D$ can alternatively be moved based on an available discharge energy $E_{DIS}$. A maximum energy $E_H$ is determined at time $T_1$ and a minimum energy $E_L$ is determined at time $T_2$. The available discharge energy $E_{DIS}$ is determined by the difference between the maximum energy $E_H$ and the minimum energy $E_L$ ($E_{DIS}=E_H-E_L$). The discharge line $L_D$ is then moved higher than the average expected consumption line $C_{EXP}$ until the difference between the average expected consumption line $C_{EXP}$ and the revised discharge line $L_{D'}$ during the revised discharging period $T_{DIS'}$ equals the available discharge energy $E_{DIS}$. Movement of the revised discharge line $L_{D'}$ and the corresponding calculation (based on either the departure energy difference $E_A$, or the available discharge energy $E_{DIS}$) can be iterated until the equation is solved.

Figure 11B:
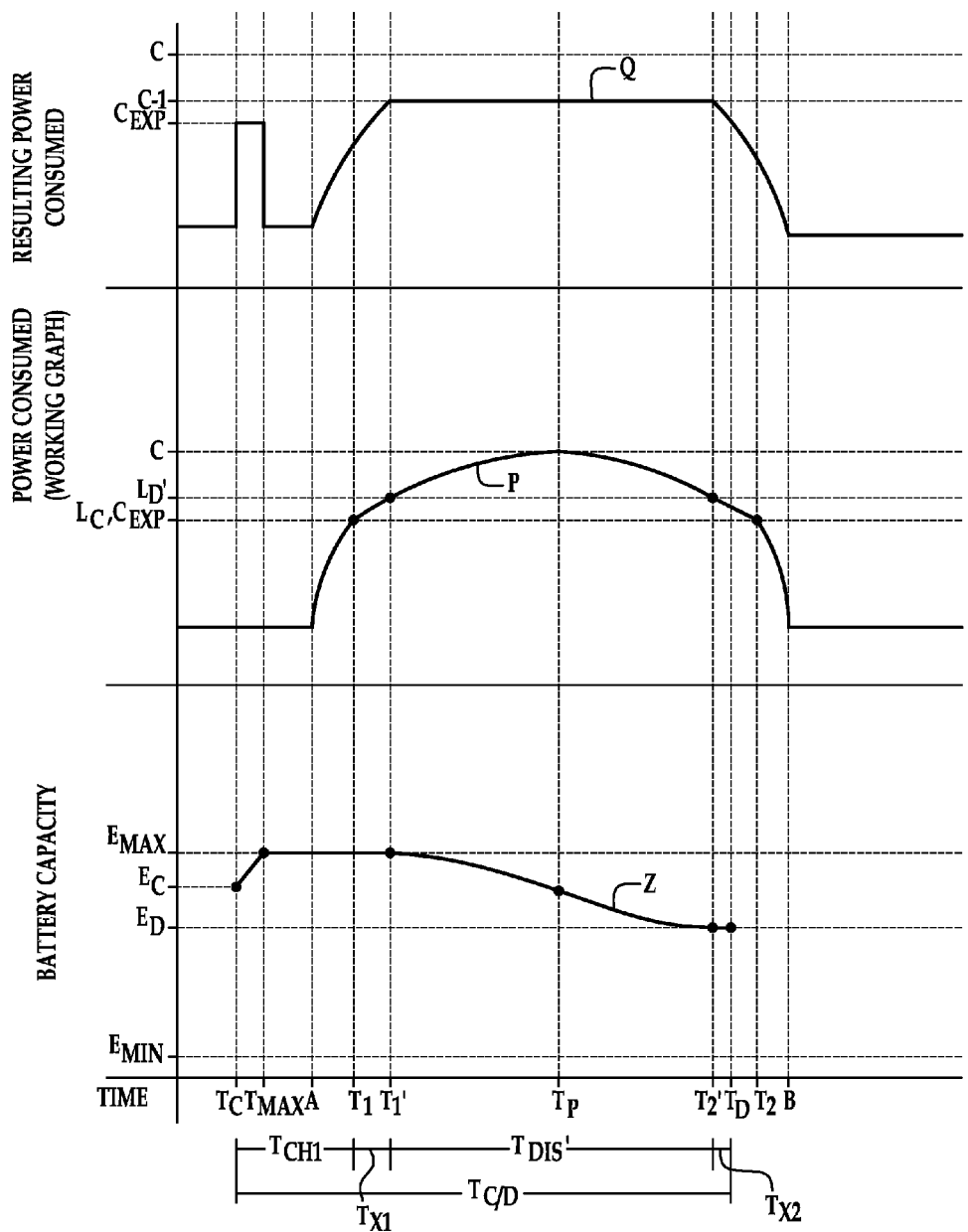

FIG. 11B illustrates the discharge line $L_D$ being moved higher than the average expected consumption line $C_{EXP}$. When the equation is solved and the revised discharge line $L_{D'}$ is positioned, a new time $T_{1'}$ and new time $T_{2'}$ can be determined from where the revised discharge line $L_{D'}$ crosses the actual consumption line P. Because the difference between the charge line $L_C$ and the actual consumption line P is positive at the connection time $T_C$, charging begins at the connection time $T_C$. Based on the difference between the charge line $L_C$ and the actual consumption line P, charging would occur during the charging period $T_{CH1}$ until time $T_1$ is reached. However, as seen in FIG. 11B, the maximum energy $E_{MAX}$ is reached at time $T_{MAX}$ before time $T_1$. Therefore, charging is stopped when the battery is fully charged to the maximum energy $E_{MAX}$. Charging and discharging are both idled during the idling period $T_{X1}$ between time $T_{MAX}$ and $T_{1'}$.

Discharging is now based on the revised discharging period $T_{DIS'}$, which is the period between new time $T_{1'}$ and new time $T_{2'}$. Discharge does not begin until the revised discharge line $L_{D'}$ crosses the actual consumption line P at time $T_{1'}$. Therefore, the battery is neither charging nor discharging during the first idling period $T_{X1}$ between the time $T_{MAX}$ at which full capacity $E_{MAX}$ is reached and time $T_{1'}$. Discharging takes place during the revised discharging period $T_{DIS'}$ at a rate that is based on the difference between the revised discharge line $L_{D'}$ and the actual consumption line P. When time $T_{2'}$ is reached, where the revised discharge line $L_{D'}$ crosses the actual consumption line P, discharging stops. Charging and discharging are both idled again during the second idling period $T_{X2}$ between time $T_{2'}$ and the departure time $T_D$.

The charging periods $T_{CH1}$ and $T_{CH2}$ are based on the originally calculated charge line $L_C$. As seen in FIG. 11B, there is no time $T_2$ and no second charge period $T_{CH2}$ because the departure time $T_D$ occurs before the charge line $L_C$ crosses the actual consumption line P again. Departure time $T_D$ occurs during the second idling period $T_{X2}$, so the battery remains at the required departure energy $E_D$ from time $T_{2'}$ until the departure time $T_D$.

Although the maximum peak shaving effect cannot be achieved, where the reduced peak energy consumption C−1 is equal to the average expected consumption line $C_{EXP}$, the peak shaving effect is maximized as much as possible by adjusting the discharge line $L_D$ so that the battery is discharging during the peak consumption time $T_P$ while still achieving the required departure energy $E_D$ by the departure time $T_D$. Thus, as shown by the resulting power consumption line Q in FIG. 11B, the peak energy consumption C is reduced to C−1 while still providing the required departure energy $E_D$ for the EV.

Figure 12A:
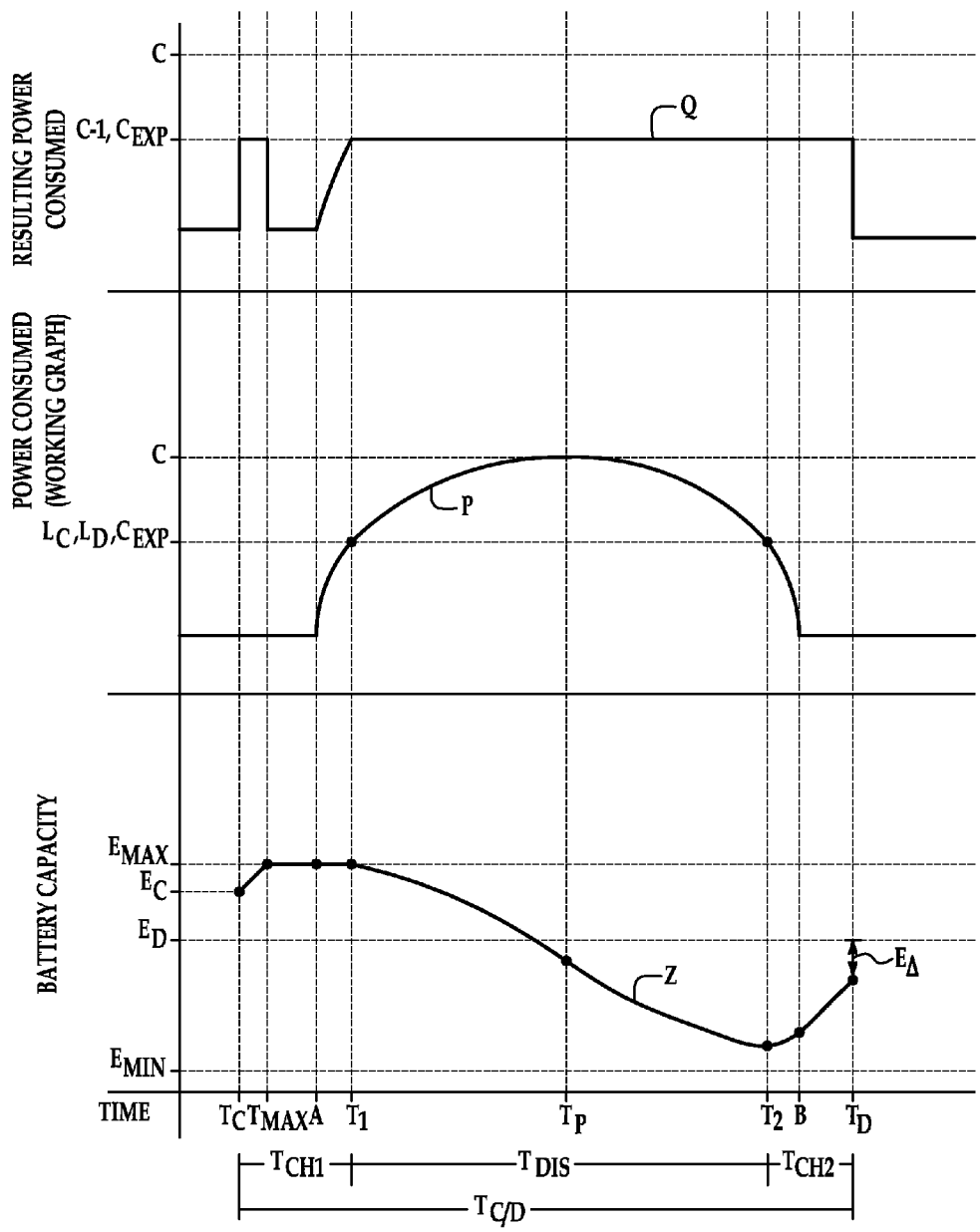
FIGS. 12A and 12B are graphs illustrating an aspect of the method of peak shaving when the predicted battery capacity at the departure time is below a required departure energy as disclosed herein.
Figure 12B:
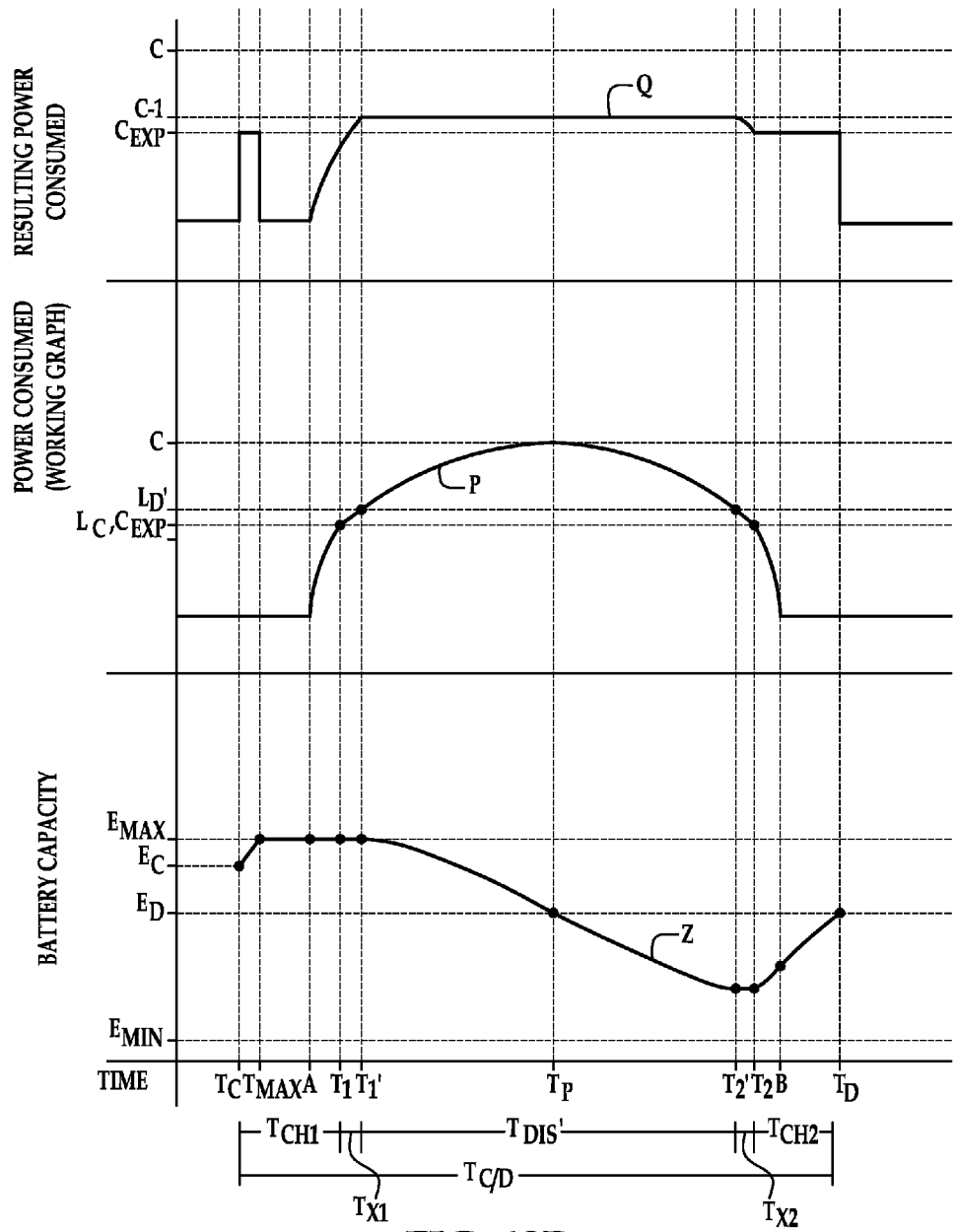

FIGS. 12A and 12B illustrate a similar example as that shown in FIGS. 11A and 11B. As in FIG. 11A, charging and discharging based on the charge line $L_C$ and the discharge line $L_D$ being equal to the average expected consumption line $C_{EXP}$ would result in a lower predicted departure energy than the required departure energy $E_D$ at departure time $T_D$, as shown by the predicted battery capacity curve Z in FIG. 12A. However, the connection period $T_{C/D}$ is longer, providing time for the second charge period $T_{CH2}$. Therefore, as seen in FIG. 12A, the departure energy difference $E_A$ is smaller than that of FIG. 11A To ensure that the EV has the required departure energy $E_D$, the discharge line $L_D$ is moved higher than the average expected consumption line $C_{EXP}$ until the difference between the average expected consumption line $C_{EXP}$ and the revised discharge line $L_{D'}$ during the revised discharging period $T_{DIS'}$ plus the difference between the actual consumption line P and the average expected consumption line $C_{EXP}$ during the idle period $T_{X1}$ from time $T_1$ to time $T_{1'}$ and the idle period $T_{X2}$ from time $T_{2'}$ to time $T_2$ (or $T_D$, whichever occurs earlier) equals the departure energy difference $E_A$ as described above. The revised discharging period $T_{DIS'}$ is a period that the revised discharge line $L_{D'}$ is below the actual consumption line P. As also described above, the discharge line $L_D$ may alternatively be moved higher than the average expected consumption line $C_{EXP}$ until the difference between the average expected consumption line $C_{EXP}$ and the revised discharge line $L_{D'}$ during the revised discharging period $T_{DIS'}$ equals the available discharge energy $E_{DIS}$. Movement of the revised discharge line $L_{D'}$ and the corresponding calculation (based on either the departure energy difference $E_A$, or the available discharge energy $E_{DIS}$) can be iterated until the equation is solved.

FIG. 12B illustrates the revised discharge line $L_{D'}$ of the moved higher than the average expected consumption line $C_{EXP}$. When the equation is solved and the revised discharge line $L_{D'}$ is positioned, a new time $T_{1'}$ and new time $T_{2'}$ can be determined from where the revised discharge line $L_{D'}$ crosses the actual consumption line P. Because the difference between the charge line $L_C$ and the actual consumption line P is positive at the connection time $T_C$, charging begins at the connection time $T_C$. Based on the difference between the charge line $L_C$ and the actual consumption line P, charging would occur until time $T_1$ is reached. However, as seen in FIG. 12B, full capacity $E_{MAX}$ is reached at time $T_{MAX}$ before time $T_1$. Therefore, charging cannot continue between the time $T_{MAX}$ and $T_{1'}$.

Discharging is now based on the revised discharging period $T_{DIS'}$, which is the period between new time $T_{1'}$ and new time $T_{2'}$ where the revised discharge line $L_{D'}$ crosses the actual consumption line P. Discharge does not begin until the revised discharge line $L_{D'}$ is below the actual consumption line P beginning at time $T_{1'}$. Therefore, the battery is neither charging nor discharging during the idling period $T_{X1}$ between the time $T_{MAX}$ that full capacity $E_{MAX}$ is reached and time $T_{1'}$. Discharging takes place during the revised discharging period at a rate that is based on the difference between the revised discharge line $L_{D'}$ and the actual consumption line P. When time $T_{2'}$ is reached, discharging stops.

The charging periods $T_{CH1}$ and $T_{CH2}$ are based on the originally calculated charge line $L_C$. As seen in FIG. 12B, discharging stops at time $T_{2'}$ and charging begins at time $T_2$. The battery is neither charging nor discharging during the second idling period $T_{X2}$ between time $T_{2'}$ and $T_2$. At time $T_2$, charging begins and continues until the departure time $T_D$ at a rate that is based on the difference between the charge line $L_C$ and the actual consumption line P as in the previous examples.

Although the maximum peak shaving effect cannot be achieved, where the reduced peak energy consumption C−1 is equal to the average expected consumption line $C_{EXP}$, the peak shaving effect is maximized as much as possible by adjusting the discharge line $L_D$ so that the battery is discharging during the peak consumption time $T_P$ while still achieving the required departure energy $E_D$ by the departure time $T_D$. Thus, as shown by the resulting power consumption line Q in FIG. 12B, the peak energy consumption C is reduced to C−1 while still providing the required departure energy $E_D$ for the EV.

Figure 13A:
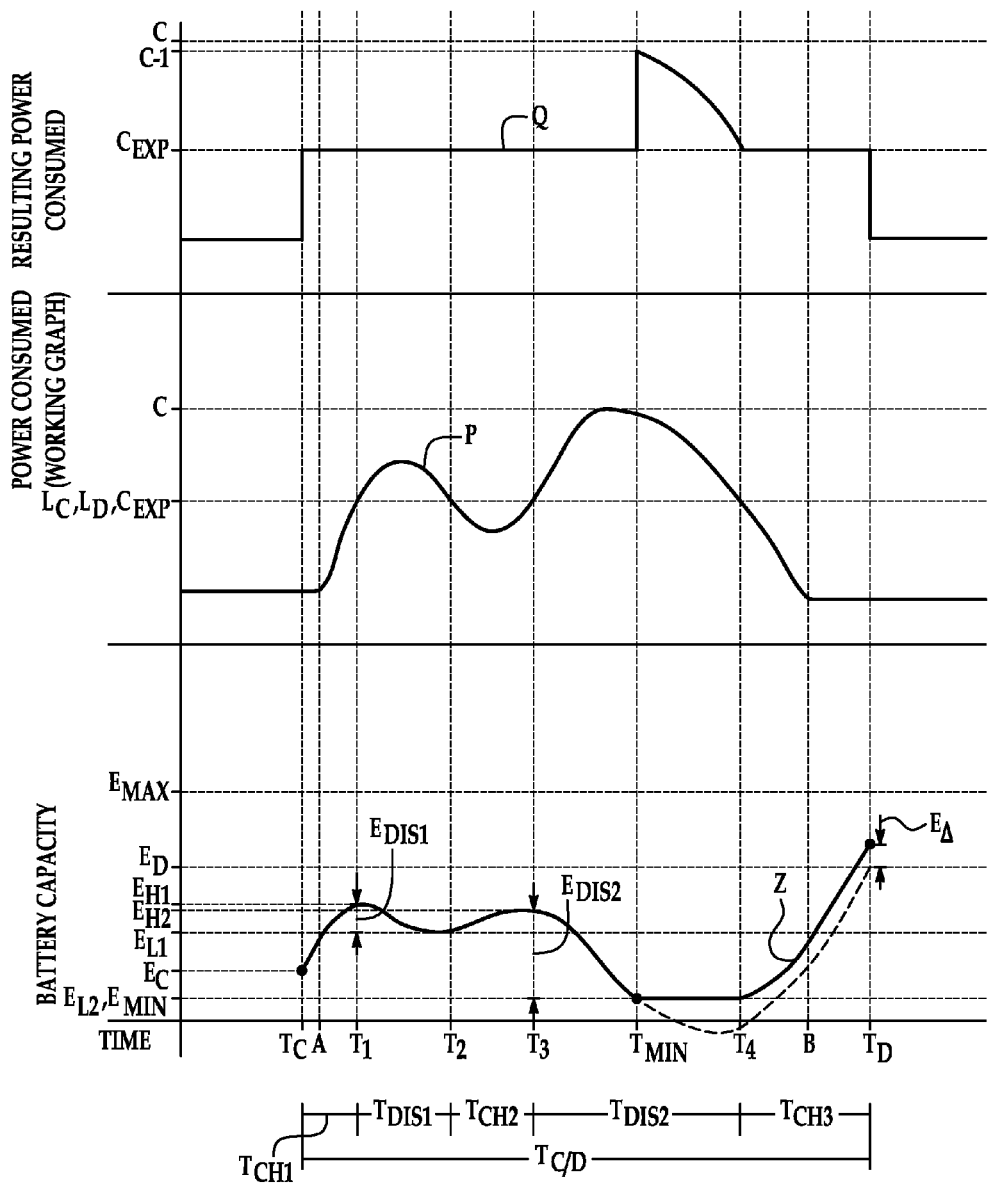
FIGS. 13A and 13B are graphs illustrating an aspect of the method of peak shaving when the actual consumption line includes multiple peak consumption times.
Figure 13B:
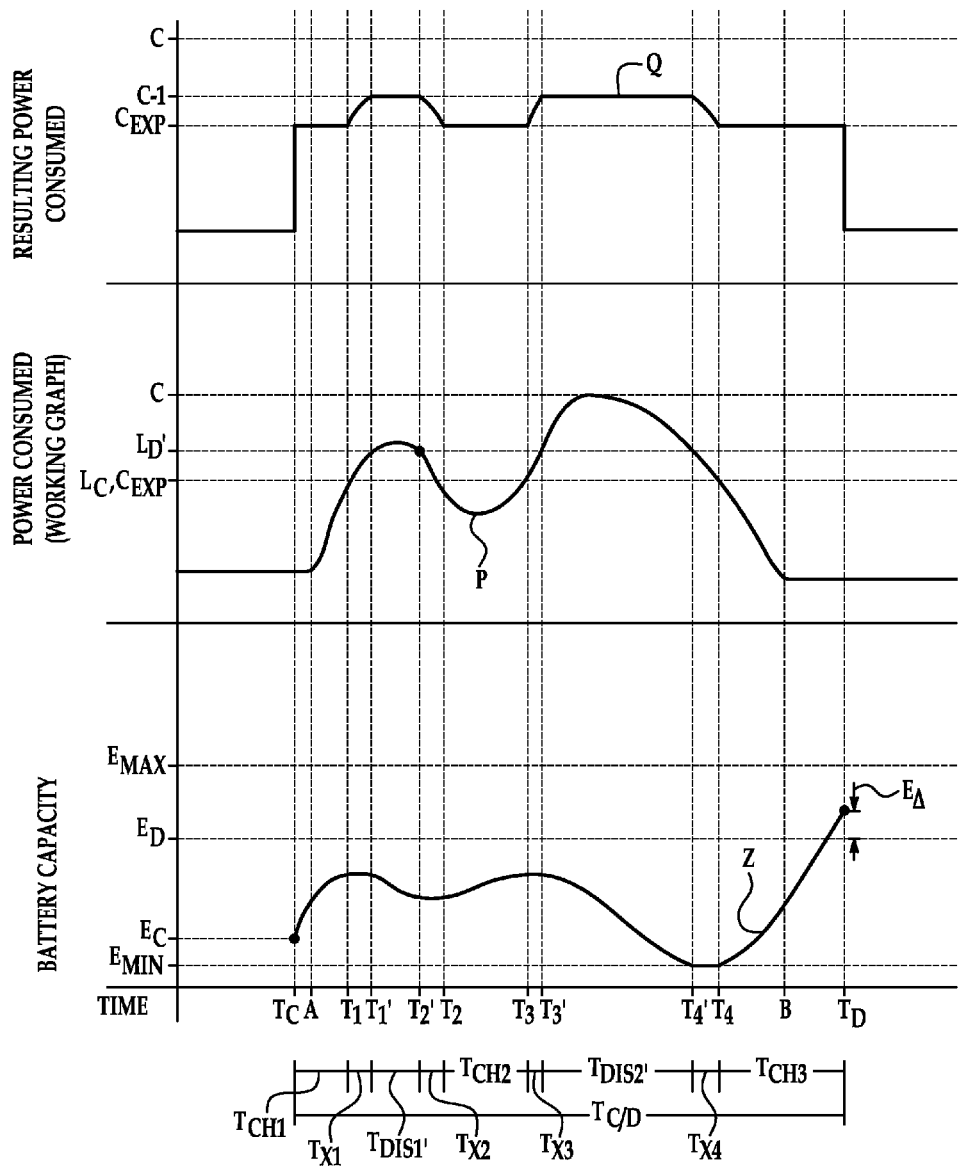

The peak shaving method disclosed herein may also be applied and effective in situations where the actual consumption line P includes multiple peaks as shown in FIGS. 13A and 13B. In FIG. 13A, the average expected consumption line $C_{EXP}$ is determined and plotted against the actual consumption line P, and the charge line $L_C$ and the discharge line $L_D$ are initially set to be equal to the average expected consumption line $C_{EXP}$. At the connection time $T_C$, the difference between the charge line $L_C$ and the actual consumption line P is positive and remains static until peak start time A, so the EV begins charging at a constant rate from connection time $T_C$ until peak start time A. At peak start time A, the difference between the charge line $L_C$ and the actual consumption line P is positive and changes dynamically as the actual consumption line P changes, so the EV continues charging at a dynamic rate from peak start time A until time $T_1$. Therefore, the first charging period $T_{CH1}$ is defined between connection time $T_C$ and time $T_1$.

At time $T_1$, the charge line $L_C$ and the discharge line $L_D$ cross the actual consumption line P, so the difference between charge line $L_C$ and the actual consumption line P and the difference between the discharge line $L_D$ and the actual consumption line P become negative. As shown by the predicted battery capacity curve Z, the battery ceases charging at time $T_1$ and begins to discharge. At time $T_2$, the charge line $L_C$ and the discharge line $L_D$ cross the actual consumption line P again, so the difference between charge line $L_C$ and the actual consumption line P and the difference between the discharge line $L_D$ and the actual consumption line P become positive. Therefore, the first discharging period $T_{DIS1}$ is defined between time $T_1$ and time $T_2$.

The battery ceases discharging at time $T_2$ and begins to charge. At time $T_3$, the charge line $L_C$ and the discharge line $L_D$ cross the actual consumption line P, so the difference between charge line $L_C$ and the actual consumption line P and the difference between the discharge line $L_D$ and the actual consumption line P become negative again. Therefore, a second charging period $T_{CH2}$ defined between time $T_2$ and time $T_3$.

The battery ceases charging at time $T_3$ and begins to discharge. At time $T_4$, the charge line $L_C$ and the discharge line $L_D$ cross the actual consumption line P again, so the difference between charge line $L_C$ and the actual consumption line P and the difference between the discharge line $L_D$ and the actual consumption line P become positive. Therefore, a second discharging period $T_{DIS2}$ is defined between time $T_3$ and time $T_4$.

However, the predicted battery capacity curve Z reaches the minimum energy $E_{MIN}$ before time $T_4$, and the battery is unable to discharge any more until time $T_4$. At time $T_4$, the charge line $L_C$ and the discharge line $L_D$ cross the actual consumption line P, so the difference between charge line $L_C$ and the actual consumption line P and the difference between the discharge line $L_D$ and the actual consumption line P become negative again. Therefore, a third charging period $T_{CH3}$ is defined between time $T_4$ and departure time $T_D$. At time $T_4$, the difference between the charge line $L_C$ and the actual consumption line P is positive and changes dynamically as the actual consumption line P changes, so the EV continues charging at a dynamic rate from $T_4$ until peak end time B. At the peak end time B, the difference between the charge line $L_C$ and the actual consumption line P is positive and remains static until departure time $T_D$, so the EV continues charging at a constant rate from peak end time B until departure time $T_D$.

As shown in FIG. 13A, if the battery is at the minimum energy $E_{MIN}$, it is not discharging over the entire discharging times $T_{DIS1}$ and $T_{DIS2}$. Therefore, even though the required departure energy $E_D$ could be achieved by departure time $T_D$, the peak energy consumption C would not be reduced due to this energy transfer deficiency.

One way to ensure that the battery is discharging during the entire discharging periods $T_{DIS1}$ and $T_{DIS2}$, thus achieving a peak shaving effect, is to reduce the time spent discharging to revised discharging periods $T_{DIS1'}$ and $T_{DIS2'}$ by moving the discharge line $L_D$ higher than the average expected consumption line $C_{EXP}$ as shown in FIG. 13B. For example, a total available discharge energy $E_{DIS}$ can be determined by the difference between a first maximum energy $E_{H1}$ at time $T_1$ and a first minimum energy $E_{L2}$ at time $T_2$ ($E_{DIS1}=E_{H1}-E_{L1}$), and the difference between a first maximum energy $E_{H2}$ at time $T_3$ and a first minimum energy $E_{L2}$ at time $T_4$ ($E_{DIS2}=E_{H2}-E_{L2}$). The total available discharge energy $E_{DIS}$ can be the sum of the available discharge energies per peak ($E_{DIS}=E_{DIS1}+E_{DIS2}$). The discharge line $L_D$ can then be moved until the sum of the difference between the average expected consumption line $C_{EXP}$ and the revised discharge line $L_{D'}$ during the revised discharging periods $T_{DIS1'}$ (from time $T_{1'}$ to time $T_{2'}$) and $T_{DIS2'}$ (from time $T_{3'}$ to time $T_{4'}$), and the difference between the actual consumption line P and the average expected consumption line $C_{EXP}$ during the idle periods $T_{X1}$ (from time $T_1$ to time $T_{1'}$), $T_{X2}$ (from time $T_{2'}$ to time $T_2$), $T_{X3}$ (from time $T_3$ to time $T_{3'}$), and $TX_4$ (from time $T_{4'}$ to $T_4$) equals the departure energy difference $E_A$. Alternatively, the revised discharge line $L_{D'}$ can be moved until the sum of the differences between the actual consumption line P and the revised discharge line $L_{D'}$ during the revised discharging periods $T_{DIS1'}$ and $T_{DIS2'}$ equals the total available discharge energy $E_{DIS}$. Movement of the revised discharge line $L_{D'}$ and the corresponding calculation can be iterated until the equation is solved.

FIG. 13B illustrates movement of the discharge line $L_D$ higher than the average expected consumption line $C_{EXP}$. When the equation is solved and the revised discharge line $L_{D'}$ is positioned, new times $T_{1'}$, $T_{2'}$, $T_{3'}$, and $T_{4'}$ can be determined from where the revised discharge line $L_{D'}$ crosses the actual consumption line P. With the revised discharge line $L_{D'}$ calculated, the new charging periods (e.g. $T_{CH1}$, $T_{CH2}$, and $T_{CH3}$), discharging periods (e.g. $T_{DIS1'}$ and $T_{DIS2'}$), and idling periods (e.g. $T_{X1}$, $T_{X2}$, $T_{X3}$, and $T_{X4}$) are determined. At the connection time $T_C$, the difference between the charge line $L_C$ and the actual consumption line P is positive and remains static until peak start time A, so the EV begins charging at a constant rate from connection time $T_C$ until peak start time A. At peak start time A, the difference between the charge line $L_C$ and the actual consumption line P is positive and changes dynamically as the actual consumption line P changes, so the EV continues charging at a dynamic rate from peak start time A until time $T_1$. Therefore, the first charging period $T_{CH1}$ is still defined between connection time $T_C$ and time $T_1$.

At time $T_1$, the charge line $L_C$ crosses the actual consumption line P, so the difference between charge line $L_C$ and the actual consumption line P becomes negative, but the difference between the revised discharge line $L_{D'}$ and the actual consumption line P remains positive, so charging and discharging are idled starting at time $T_1$. Charging and discharging are then idled until the revised discharge line $L_{D'}$ crosses the actual consumption line at time $T_{1''}$, so a first idling period $T_{X1}$ is defined between time $T_1$ and time $T_{1''}$. At time $T_{2'}$, the revised discharge line $L_{D'}$ crosses the actual consumption line P again, so the difference between the revised discharge line $L_{D'}$ and the actual consumption line P becomes positive. Therefore, a first discharging period $T_{DIS1'}$ is defined between time $T_{1'}$ and time $T_{2'}$.

The charge line $L_C$ crosses the actual consumption line P at time $T_2$ after discharging ceased at time $T_{2'}$, and the difference between charge line $L_C$ and the actual consumption line P becomes positive, so charging and discharging are idled for a second idling period $T_{X2}$ defined between time $T_2$ and time $T_{2''}$. At time $T_3$, the charge line $L_C$ crosses the actual consumption line P, and the difference between charge line $L_C$ and the actual consumption line P become negative again, so charging ceases again at time $T_3$. Therefore, a second charging period $T_{CH2}$ is defined between time $T_2$ and time $T_3$. At time $T_3$, the charge line $L_C$ crosses the actual consumption line P, so the difference between charge line $L_C$ and the actual consumption line P becomes negative, but the difference between the revised discharge line $L_{D'}$ and the actual consumption line P remains positive, so charging and discharging are idled again starting at time $T_3$. Charging and discharging are then idled until the revised discharge line $L_{D'}$ crosses the actual consumption line at time $T_{3'}$, so a third idling period $T_{X3}$ is defined between time $T_3$ and time $T_{3'}$.

At time $T_{4'}$, the revised discharge line $L_{D'}$ crosses the actual consumption line P again, so the difference between the revised discharge line $L_{D'}$ and the actual consumption line P becomes positive. Therefore, a second discharging period $T_{DIS2'}$ is defined between time $T_{3'}$ and time $T_{4'}$.

The charge line $L_C$ crosses the actual consumption line P at time $T_4$ after discharging ceased at time $T_{4'}$, and the difference between charge line $L_C$ and the actual consumption line P becomes positive, so charging and discharging are idled for a fourth idling period $T_{X4}$ defined between time $T_{4'}$ and time $T_4$. At time $T_4$, the difference between the charge line $L_C$ and the actual consumption line P is positive and changes dynamically as the actual consumption line P changes, so the EV charges at a dynamic rate from $T_4$ until peak end time B. At the peak end time B, the difference between the charge line $L_C$ and the actual consumption line P is positive and remains static until departure time $T_D$, so the EV continues charging at a constant rate from peak end time B until departure time $T_D$. Therefore, a third charging period is defined between time $T_4$ and departure time $T_D$.

As seen in FIG. 13B, the charging periods (e.g. $T_{CH1}$, $T_{CH2}$, and $T_{CH3}$) are based on the originally calculated charge line $L_C$, the revised discharging periods (e.g. $T_{DIS1'}$ and $T_{DIS2'}$) are based on the revised discharge line $L_{D'}$, and the idling periods (e.g. $T_{X1}$, $T_{X2}$, $T_{X3}$, and $T_{X4}$) are based on the charge line $L_C$ and the revised discharge line $L_{D'}$. Although the idling periods $T_{X1}$, $T_{X2}$, $T_{X3}$, and $T_{X4}$ are shown as positioned between alternating charging and discharging periods, it is contemplated that idling periods may be positioned between sequential ones of charging and discharging periods. For example, if the revised discharge line $L_{D'}$ needed to be moved above the lower peak in FIG. 13B to satisfy the equation, there would be an idling period positioned between two sequential charging periods.

As shown by the resulting power consumption line Q in FIG. 13B, the peak energy consumption C is reduced to C−1, which is larger than $C_{EXP}$. Although the maximum peak shaving effect cannot be achieved, where the reduced peak energy consumption C−1 is equal to the average expected consumption line $C_{EXP}$, the peak shaving effect is maximized as much as possible by adjusting the discharge line $L_D$ so that the battery is still discharging during the entire discharging periods $T_{DIS1'}$ and $T_{DIS2'}$ while still achieving the required departure energy $E_D$ by the departure time $T_D$.

Figure 14:
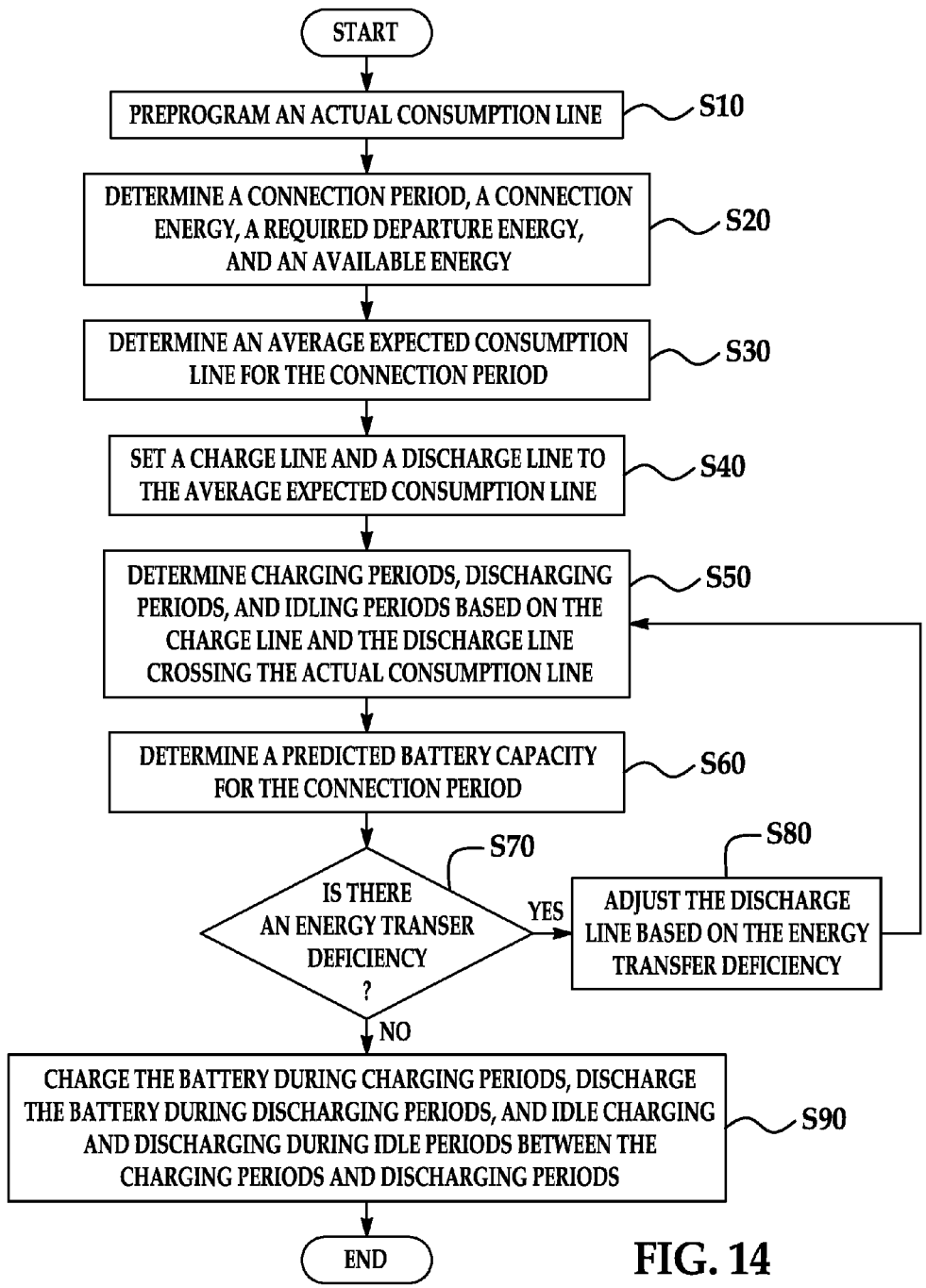
FIG. 14 is a flow diagram of a method of peak shaving as disclosed herein.
Figure 15:
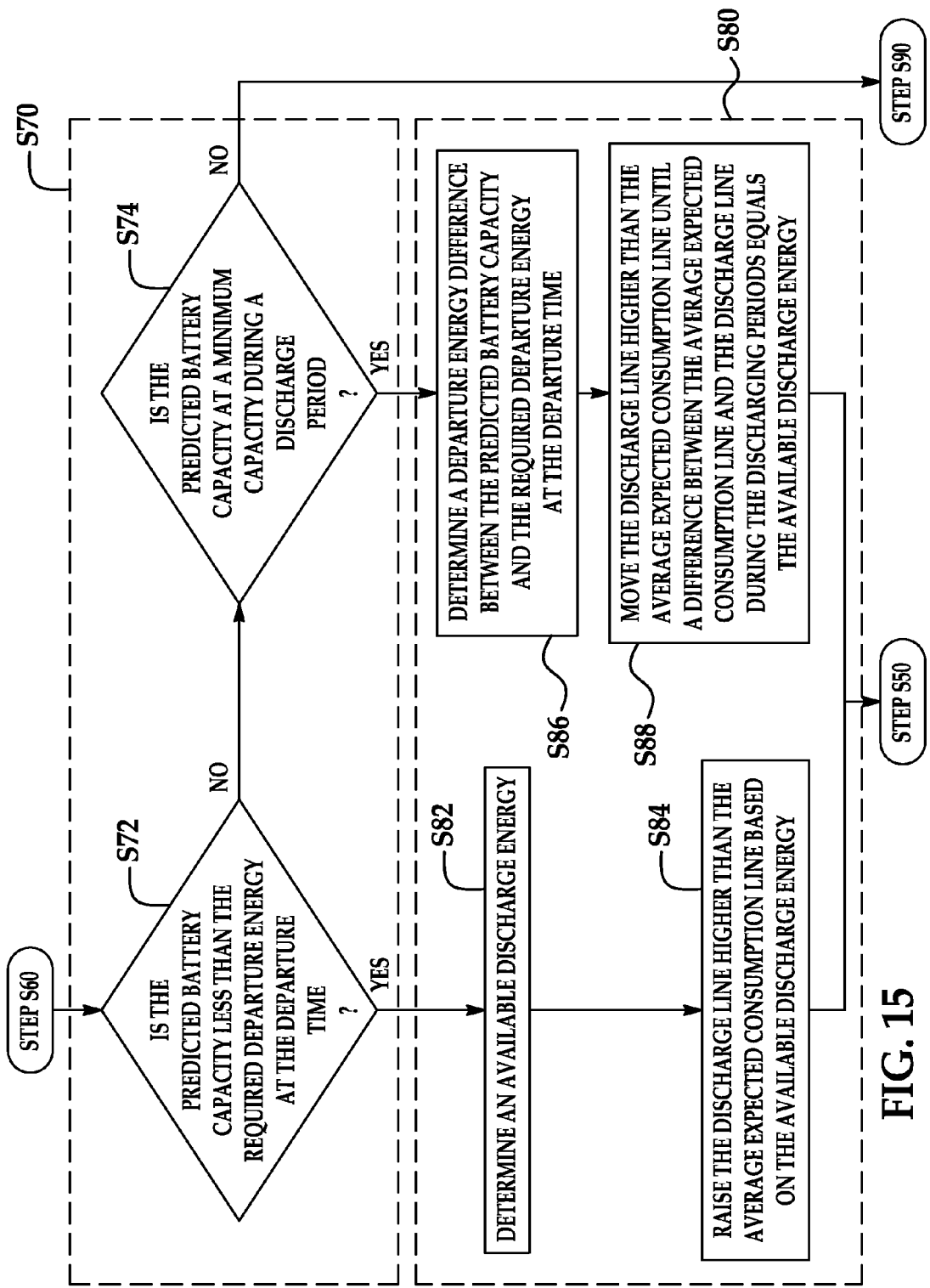
FIG. 15 is a flow diagram of an aspect of the method of peak shaving as disclosed herein.

FIGS. 14-15 are flow diagrams of methods that are illustrated in FIGS. 5 through 13B. In FIG. 14, an actual consumption line P is preprogrammed in step S10. When an EV connects to the charging station, the connection period $T_{C/D}$ is determined based on the connection time $T_C$ and the predetermined or inputted departure time $T_D$, the connection energy $E_C$ is detected, the required departure energy $E_D$ is preprogrammed or inputted, and the available energy $E_A$ is calculated in step S20. The average expected consumption line $C_{EXP}$ is determined in step S30 based on the preprogrammed actual consumption line P, the connection energy $E_C$, the required departure energy $E_D$ and the connection period $T_{C/D}$. The charge line $L_C$ and the initial discharge line $L_D$ are set to the average expected consumption line $C_{EXP}$ in step S40. In step S50, the charging periods (e.g. $T_{CH1}$ and $T_{CH2}$) and discharging period (e.g. $T_{DIS}$) are determined based on where the charge line $L_C$ and initial discharge line $L_D$ cross the actual consumption line P. A predicted battery capacity curve Z is then determined and plotted based on the charge line $L_C$, the initial discharge line $L_D$ and the actual consumption line P in step S60.

Whether there is an energy transfer deficiency is determined in step S70 of the flow diagram in FIG. 14. If there is an energy transfer deficiency, the method will proceed to step S80 to adjust the discharge line $L_D$ to a revised discharge line $L_{D'}$ based on the energy transfer deficiency, and then return to step S50. Upon return to step S50, the charging periods (e.g. $T_{CH1}$ and $T_{CH2}$), revised discharging periods (e.g. $T_{DIS'}$), and idling periods (e.g. $T_{X1}$ and $T_{X2}$) are determined based on where the charge line $L_C$ and the revised discharge line $L_{D'}$ cross the actual consumption line P. The predicted battery curve Z is then determined and plotted based on the charge line $L_C$, revised discharge line $L_{D'}$, and the actual consumption line P in step S60, and the method then proceeds to step S70.

If the charge line $L_C$ and initial discharge line $L_D$ are set such that it is determined in step S70 that there is no energy transfer deficiency, the method will proceed to step S90. In step S90, the battery is charged during the charging periods (e.g. $T_{CH1}$ and $T_{CH2}$), discharged during the discharging period (e.g. $T_{DIS}$ or $T_{DIS'}$), and charging and discharging are both idled during idling periods (e.g. $T_{X1}$, and $T_{X2}$).

The flow diagram of FIG. 15 describes an example of steps S70 (including steps S72 and S74) and S80 (including steps S82, S84, S86 and S86) in more detail. Determining the energy transfer deficiency begins in step S72 by determining whether the predicted battery capacity Z at the departure time $T_D$ is less than the required departure energy $E_D$. If it is determined at step S72 that the predicted battery capacity Z at the departure time $T_D$ is greater than or equal to the required departure energy $E_D$, the method proceeds to step S74. In step S74, it is determined whether the predicted battery capacity Z is at the minimum energy $E_{MIN}$ during the discharging periods. If it is determined at step S74 that the predicted battery capacity Z is above the minimum energy $E_{MIN}$ during the discharging periods (i.e. before the end of the discharge periods), thus indicating the battery will be discharging during the entirety of the discharging periods, the method proceeds to step S90 since no adjustments are required.

If it is determined at step S72 that the predicted battery capacity Z at the departure time $T_D$ is less than the required departure energy $E_D$, the method proceeds to step S82 to determine the departure energy difference $E_A$. The discharge line $L_D$ is then adjusted at step S84 based on the departure energy difference $E_A$ as described above, and the method then returns to step S50.

If it is determined at step S74 that the predicted battery capacity Z is at the minimum energy $E_{MIN}$ during the discharging periods, thus indicating the battery will not be discharging during the entirety of the discharging periods, the method proceeds to step S86 to determine the available discharge energy $E_{DIS}$. Then, in step S88, the discharge line $L_D$ is adjusted based on the available discharge energy $E_{DIS}$, and the method then returns to step S50.

The examples provided in FIGS. 5-13B illustrate the methods disclosed using a single EV. Therefore, for a power consumer with multiple charging stations, the method will be replicated for each EV when a new EV is connected to one of the multiple charging stations to achieve the maximum peak shaving effect possible. The greater the number of EVs connected over the peak consumption time $T_P$, the greater the reduction of the peak energy consumption.

Figure 16:
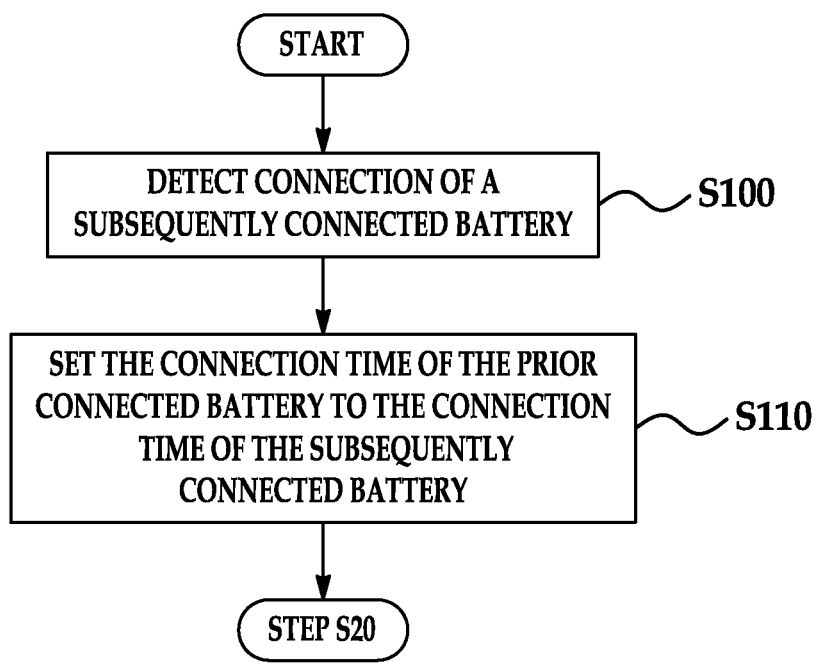
FIG. 16 is a flow diagram of another aspect of the method of peak shaving as disclosed herein.

An even greater peak shaving effect may be achieved using multiple EVs by performing a recalculation upon the connection of each subsequent EV. An example of a method for recalculation is shown in FIG. 16. Starting at step 100, a connection of a subsequently connected battery to the power consumer is detected. Detecting connection of the subsequently connected battery can be performed by a single charging station with multiple connections, direct communication between multiple charging stations, or indirect communication between multiple charging stations via the power provider or grid, for example. Upon detection of connection of a subsequently connected battery, the method proceeds to step S100, in which the connection time $T_C$ for the prior connected battery is set to the connection time $T_C$ of the subsequently connected battery. The method then returns to step S20, where the connection period $T_{C/D}$, the connection energy $E_C$, the required departure energy $E_D$, and the available energy $E_A$ are recalculated based on the new connection time $T_C$. The method then proceeds through FIG. 14 as described above.

It should be noted that many of the steps in any of the methods disclosed herein can be performed in a different order than described. The order in which the steps are described is not meant to be limiting. If the steps can be performed in a different order while arriving at the same result, than that order is contemplated herein and in the claims.

It should also be noted that even though the methods disclosed herein are graphically demonstrated by plotting lines on graphs, the methods can be performed by assigning variable values over time for the actual consumption line P and predicted battery capacity curve Z, and constant values for the average expected consumption line $C_{EXP}$, the charge line $L_C$, and the discharge line $L_D$. Accordingly, the time points where the charge line $L_C$ and discharge line $L_D$ "cross" the actual consumption line P can be determined to be when a value of P is equal to the charge line $L_C$ or the discharge line $L_D$, without requiring a graph to be plotted to make the determinations required by the methods described herein.

While the methods herein describe charging and discharging batteries of electric vehicles (EVs), it is contemplated that the method is suitable for application to other mobile batteries configured to be selectively connected and disconnected according to a connection period $T_{C/D}$. EVs provide an effective example as EV batteries have a substantially large capacity and are expected to be frequently connected to and disconnected from charging stations. However, the method may apply equally as well to other mobile devices having batteries configured for selective connection to and disconnection from charging stations including but not limited to plug-in hybrid vehicles (HEVs), mobile telephonic and computing devices (e.g. cellular telephones, laptops, tablets, etc.), and backup battery systems. Additionally, it is contemplated that the methods may also equally apply when such mobile batteries are connected through their associated devices or vehicle systems, or removed from their associated devices or vehicle systems and are connected directly or through intermediate systems.

The methods herein can be implemented in whole or in part by one or more processors which can include computers, servers, or any other computing device or system capable of manipulating or processing information now-existing or hereafter developed including optical processors, quantum processors and/or molecular processors. Suitable processors also include, for example, general purpose processors, special purpose processors, IP cores, ASICS, programmable logic arrays, programmable logic controllers, microcode, firmware, microcontrollers, microprocessors, digital signal processors, memory, or any combination of the foregoing. The methods can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms and/or instructions described herein. In the claims, the term "processor" should be understood as including any the foregoing, either singly or in combination. Herein, the terms "program" and "process" should be understood to run on the processor.

Further, all or a portion of embodiments described herein can take the form of a computer program product accessible from, for example, a computer-usable or computer-readable medium. A computer-usable or computer-readable medium can be any device that can, for example contain, store, communicate, and/or transport the program for use by or in connection with any computing system or device. The medium can be, for example, an electronic, magnetic, optical, electromagnetic, or a semiconductor device. Other suitable mediums are also available.

The methods disclosed may incorporate user input for one or more variables. The processor used for these methods can include a user interface, a display, a key pad, a touch screen and any other devices that are known to those skilled in the art to assist in the interface between processor and user.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method performed by a computer program for decreasing peak energy consumption of a power consumer comprising:
preprogramming an actual consumption line based on expected power usage, the actual consumption line having a peak consumption time;

determining a connection period of a selectively connectable battery to a charging station of the power consumer between a connection time and a departure time;

determining an available energy based on a required departure energy and a connection energy;

determining an average expected consumption line over the connection period based on the actual consumption line, the required departure energy, and the connection energy;

determining a charge line and a discharge line based on the average expected consumption line;

determining charging periods and discharging periods based on the charge line, discharge line, and the actual consumption line;

determining a predicted battery capacity across the connection period and an energy transfer deficiency;

adjusting the discharge line based on the energy transfer deficiency, wherein if the predicted battery capacity at the departure time is greater than the required departure energy, and if the predicted battery capacity is between a maximum threshold and a minimum threshold during the discharging periods, adjusting the discharge line equal to the average expected consumption line;

charging the battery with the power consumer during the charging periods; and discharging the battery to the power consumer during the discharging periods.

2. The method of claim 1, further comprising:
determining a charge rate from the difference between the charge line and the actual consumption line; and
determining a discharge rate from the difference between the discharge line and the actual consumption line.

3. The method of claim 1, wherein the charging periods are periods when a difference between the charge line and the actual consumption line is positive.

4. The method of claim 1, wherein the discharging periods are periods when a difference between the discharge line and the actual consumption line is negative.

5. The method of claim 1, wherein the step of determining charging periods and discharging periods comprises determining charging periods based on the charge line crossing the actual consumption line and discharging periods based on the discharge line crossing the actual consumption line.

6. The method of claim 1, further comprising:
determining idling periods between sequential ones of the charging periods and the discharging periods; and
idling charging and discharging of the battery during the idling periods.

7. The method of claim 6, wherein, if the predicted battery capacity at the departure time is less than the required departure energy, the step of adjusting the discharge line based on the energy transfer deficiency comprises:
determining a departure energy difference between the required departure energy and the predicted battery capacity at the departure time; and
moving the discharge line higher than the average expected consumption line until the difference between the average expected consumption line and the discharge line during the discharging period plus the difference between the actual consumption line and the average expected consumption line during the idling periods equals the departure energy difference.

8. The method of claim 1, wherein, if the predicted battery capacity is at a minimum threshold during one of the discharging periods, the step of adjusting the discharge line based on the energy transfer deficiency comprises:

determining a maximum energy from the charging periods, a minimum energy from the discharging periods, and an available discharge energy based on the maximum energy and minimum energy; and moving the discharge line higher than the average expected consumption line until a difference between the actual consumption line and a revised discharge line during the discharging period equals the available discharge energy.

9. The method of claim 1, wherein, if the predicted battery capacity is at a minimum threshold during one of the discharging periods, the step of adjusting the discharge line based on the energy transfer deficiency comprises:

determining a maximum energy from the charging periods, a minimum energy from the discharging periods, and an available discharge energy based on the maximum energy and minimum energy; and moving the discharge line higher than the average expected consumption line until difference between the average expected consumption line and the discharge line during the discharging period plus the difference between the actual consumption line and the average expected consumption line during the idling periods equals the departure energy difference.

10. The method of claim 1, further comprising:
detecting connection of a subsequently connected battery at a second connection time.

11. The method of claim 10, wherein the connection period of the first battery is determined to be the second connection time upon detecting the connection of the subsequently connected battery.

12. The method of claim 1, wherein the actual consumption line has a single peak consumption time.

13. The method of claim 1, wherein the actual consumption line has multiple peak consumption times.

14. A method performed by a computer program for decreasing peak energy consumption of a power consumer comprising:

preprogramming an actual consumption line based on expected power usage, the actual consumption line having a peak consumption time;

determining a connection period of a selectively connectable battery to a charging station of the power consumer between a connection time and a departure time;

determining an available energy based on a difference between a connection energy and a required departure energy;

determining an average expected consumption line over the connection period based on the actual consumption line and the available energy;

setting a charge line and a discharge line equal to the average expected consumption line;

determining charging periods and discharging periods based on the charge line and discharge line crossing the actual consumption line;

determining a predicted battery capacity across the connection period based on charging the battery during the charging periods and discharging the battery during the discharging periods;

determining whether there is an energy transfer deficiency;

adjusting the discharge line based on the energy transfer deficiency;

determining idling periods between sequential ones of the charging periods and the discharging periods; and idling charging and discharging of the battery during the idling periods, wherein, if the predicted battery capacity at the departure time is less than the required departure energy, adjusting the discharge line comprises:
   determining a departure energy difference between the required departure energy and the predicted battery capacity at the departure time; and
   moving the discharge line higher than the average expected consumption line until the difference between the average expected consumption line and the discharge line during the discharging period plus the difference between the actual consumption line and the average expected consumption line during the idling periods equals the departure energy difference.

15. The method of claim 14, wherein, if the predicted battery capacity is at a minimum threshold during one of the discharging periods, the step of adjusting the discharge line based on the energy transfer deficiency comprises:
   determining a maximum energy from the charging periods, a minimum energy from the discharging periods, and an available discharge energy based on a difference between the maximum energy and the minimum energy; and
   moving the discharge line higher than the average expected consumption line until a difference between the actual consumption line and a revised discharge line during the discharging period equals the available discharge energy.

16. The method of claim 14, wherein, if the predicted battery capacity is at a minimum threshold during one of the discharging periods, the step of adjusting the discharge line based on the energy transfer deficiency comprises:
   determining a maximum energy from the charging periods, a minimum energy from the discharging periods, and an available discharge energy based on the maximum energy and minimum energy; and
   moving the discharge line higher than the average expected consumption line until difference between the average expected consumption line and the discharge line during the discharging period plus the difference between the actual consumption line and the average expected consumption line during the idling periods equals the departure energy difference.

17. The method of claim 14, wherein the charging periods are periods when a difference between the charge line and the actual consumption line is positive.

18. The method of claim 14, wherein the discharging periods are periods when a difference between the discharge line and the actual consumption line is negative.

* * * * *